(12) United States Patent
Elliott et al.

(10) Patent No.: US 8,163,204 B2
(45) Date of Patent: Apr. 24, 2012

(54) NANOPOROUS POLYMER ELECTROLYTE

(75) Inventors: Brian Elliott, Wheat Ridge, CO (US); Vinh Nguyen, Wheat Ridge, CO (US)

(73) Assignee: TDA Research, Wheat Ridge, CO (US)

( * ) Notice: Subject to any disclaimer, the term of this patent is extended or adjusted under 35 U.S.C. 154(b) by 0 days.

(21) Appl. No.: 12/539,755

(22) Filed: Aug. 12, 2009

(65) Prior Publication Data

US 2010/0075195 A1 Mar. 25, 2010

Related U.S. Application Data

(62) Division of application No. 11/375,509, filed on Mar. 14, 2006, now abandoned.

(51) Int. Cl.
*H01B 1/00* (2006.01)
(52) U.S. Cl. ............ 252/500; 252/299.5; 429/300; 429/494; 526/333
(58) Field of Classification Search ............. 252/229.01, 252/299.5, 500; 429/33, 300, 494; 526/333
See application file for complete search history.

(56) References Cited

U.S. PATENT DOCUMENTS

| 5,162,475 | A | * | 11/1992 | Tang et al. ............... 526/333 |
| 5,849,215 | A | * | 12/1998 | Gin et al. ............... 252/299.01 |
| 6,248,469 | B1 | | 6/2001 | Formato et al. |
| 7,090,788 | B2 | | 8/2006 | Elliott |
| 7,540,991 | B2 | | 6/2009 | Shimoyama et al. |
| 2004/0211939 | A1 | * | 10/2004 | Elliott ............... 252/299.01 |
| 2007/0218371 | A1 | | 9/2007 | Elliott et al. |

FOREIGN PATENT DOCUMENTS

| JP | 2001338689 A | | 12/2001 |
| JP | 2006-049157 | * | 2/2006 |
| WO | WO 00/27890 | * | 5/2000 |
| WO | WO 2004/060531 A1 | * | 7/2004 |
| WO | WO 2004/081979 A2 | | 9/2004 |

OTHER PUBLICATIONS

Barton (1996) "Free-Radical Polymerization in Inverse Microemulsions" Prog. Polym. Sci. 21:399-438.
Capek (1999) "Radical Polymerization of Polar Unsaturated Monomers in Direct Microemulsion Systems" Advances in Colloid and Interface Science 80:85-149.
Cheguillaume et al. (2003) "A Practical Synthesis of 2,2-Difluoro-3-Amino-Propanoic Acid (α,α-difluoro-β-alanine)" Tetrahedron Letters 44:2375-2377.
Collings (1990) "Liquid Crystals—Nature's Delicate Phase of Matter" Princeton University Press, pp. 3-23 and cover.
Fontell (1990) "Cubic Phases in Surfactant and Surfactant-Like Lipid Systems" Colloid Polym. Sci., 268:264-285.

(Continued)

*Primary Examiner* — Khanh Tuan Nguyen
(74) *Attorney, Agent, or Firm* — Swanson & Bratschun, L.L.C.

(57) ABSTRACT

A nanoporous polymer electrolyte and methods for making the polymer electrolyte are disclosed. The polymer electrolyte comprises a crosslinked self-assembly of a polymerizable salt surfactant, wherein the crosslinked self-assembly includes nanopores and wherein the crosslinked self-assembly has a conductivity of at least $1.0 \times 10^{-6}$ S/cm at 25° C. The method of making a polymer electrolyte comprises providing a polymerizable salt surfactant. The method further comprises crosslinking the polymerizable salt surfactant to form a nanoporous polymer electrolyte.

5 Claims, 23 Drawing Sheets

OTHER PUBLICATIONS

Gin et al. (1999) "Polymerizable Liquid Crystals as Building Blocks for Functional, Nanostructured Materials" Synlett, 10:1509-1522.

Gin et al. (2001) "Polymerized Lyotropic Liquid Crystal Assemblies for Materials Applications" Acc. Chem. Res., 34:973-980.

Huang et al. (2001) "High Energy Density, Thin-Film, Rechargeable Lithium Batteries for Marine Field Operations" Journal of Power Sources, 97-98: 674-676.

Linden (2002) "Rechargeable Lithium Batteries (Ambient Temperature)" Handbook of Batteries, Third Edition the McGraw-Hill Companies, Inc., pp. 34, 15 and cover.

Lee et al. (1995) "Polymerization of Nonlamellar Lipid Assemblies" J. Am. Chem. Soc., 117:5573-5578.

Miller et al. (1999) "Nanostructured Materials Based on Polymerizable Amphiphiles" Current Opinion in Colloid & Interface Science, 4:338-347.

Nazri (2002) "Issues in Energy Storage for Electric-Based Transportation" MRS Bulletin, pp. 628-631.

Niitani et al. (2005) "Synthesis of Li$^+$ Ion Conductive PEO-PSt Block Copolymer Electrolyte with Microphase Separation Structure" Electrochemical and Solid-State Letters 8:A385-A388.

Office Action (Non-Final) mailed Sep. 22, 2009 with respect to U.S. Appl. No. 11/375,509.

Paleos (1985) "Polymerization in Organized Systems" Chemical Society Reviews, 14(1):45-67 and cover.

Ratner et al. (2000) "Polymer Electrolytes: Ionic Transport Mechanisms and Relaxation Coupling" MRS Bulletin, pp. 31-37.

Resel et al. (2000) "Structural Properties of Polymerised Lyotropic Liquid Crystals Phases of 3,4,5-Tris ($\omega$-Acryloxyalkoxy)Benzoate Salts" Macromol. Chem. Phys. 201:1128-1133.

Ringsdorf et al. (1988) "Molecular Architecture and Function of Polymeric Oriented Systems: Models for the Study of Organization, Surface Recognition, and Dynamics of Biomembranes" Angew. Chem. Int. Ed. Engl., 27:113-158.

Sadoway (2004) "Block and Graft Copolymer Electrolytes for High-Performance, Solid-State, Lithium Batteries" Journal of Power Sources, pp. 1-3.

Schnur et al. (1987) "Lipid-Based Tubule Microstructures" Thin Solid Films, 152:181-206.

Tiddy (1980) "Surfactant-Water Liquid Crystal Phases" Physics Reports 57(1):1-46.

Wei & Shriver (1998) "Highly Conductive Polymer Electrolytes Containing Rigid Polymers" Chem. Mater., 10:2307-2308.

Yasuda (1999) "Polymerizable Surfactants: Spontaneous Polymerization in Organized Micellar Media", Annual Surfactants Review 2:317-338.

Office Action Final with respect to U.S. Appl. No. 11/375,509.

Office Action with respect to U.S. Appl. No. 11/375,509.

* cited by examiner

Cubic

NANOPOROUS POLYMER ELECTROLYTE

CROSS-REFERENCE TO RELATED APPLICATIONS

This application is a divisional of U.S. application Ser. No. 11/375,509, filed Mar. 14, 2006, and entitled "Nanoporous Polymer Electrolyte".

STATEMENT REGARDING FEDERALLY SPONSORED RESEARCH OR DEVELOPMENT

This invention was made, at least in part, with funding from the Department of Energy Contract No. DE-FG02-04ER84093. Accordingly, the U.S. government may have certain rights in the invention.

BACKGROUND

1. Field of the Invention

This invention relates generally to the field of polymer electrolytes. More specifically, the invention relates to the use of polymerizable salt surfactants as a nanoporous polymer electrolyte.

2. Background of the Invention

Many portable electronic devices as well as electric, hybrid and fuel cell vehicles require high performance rechargeable batteries. Presently, lithium batteries are the battery of choice due to its high energy density and power. The key to market success for electric vehicles is the energy storage device, which limits driving distance and acceleration. Rechargeable lithium batteries are the most promising technology for storing energy and delivering it on demand for electric vehicles because lithium batteries potentially have high energy densities (400 Wh/kg) and high power densities (800 W/kg), and therefore can meet, in principle, all of the performance requirements.

One aspect of the lithium battery assembly that needs to be improved in order to make rechargeable battery performance suitable for applications such as electric vehicles is the electrolyte. The electrolyte usually comprises a separator material and the electrolyte itself. The separator material allows lithium ion exchange, but prevents electrical conduction between the anode and cathode. The electrolyte is generally a lithium salt (such as $LiCF_3SO_3$ or $LiPF_6$) dissolved in an organic solvent (for example ethylene carbonate and propylene carbonate), while the separator material is usually a polymer, although there are many variations, ranging from solvent in polymer "gels" to solvent-free polymer electrolytes. Solvent-based batteries often contain flammable liquid and are potentially unsafe. Additionally, solvents tend to participate in undesired reactions at the battery electrodes and can leak out of the casing.

Conversely, solvent-free polymer systems, such as polyethylene oxide (PEO) with lithium salts are safer, but have inherently low ionic conductivity, especially at low temperatures (i.e. lower than $10^{-8}$ S/cm at $-40°$ C.). It is desirable to have an electrolyte/separator material for battery systems (in electric vehicles for example) that is polymeric, has a high $Li^+$ capacity (concentration) and a usefully high $Li^+$ conduction at temperatures ranging from $-40$ to $85°$ C.

Most polymer electrolytes developed to date have been based primarily on alkyl-ethers such as polyethylene oxide (PEO) modified with lithium salts. These electrolytes are not stable enough to be used with metallic lithium anodes. Resistive layers form at the interface due to mobility of anions, and lithium metal particles and dendrites form upon charging and discharging (which then migrate into the soft polymer electrolytes and form short circuits). Additionally, these electrolytes are dual ion conductors where ionic conduction is dominated by the anion and lithium transport accounts for only 30 to 50% of the total ionic conduction. In this type of electrolyte, ion conduction depends primarily on polymer segmental motion (i.e. thermal motion). However, polymer segmental motion is a function of temperature and the conductivity is significantly reduced at low temperature as the polymer motion decreases. Low temperature conductivity can be improved by adding non-aqueous liquid additives to the electrolyte, but this in not practical due to concerns about dimensional stability and leakage.

Consequently, there is a need for in the art for a polymer electrolyte that exhibits good room temperature conductivity and very little decrease in conductivity at low temperatures, without the addition of volatile solvents or plasticizers.

BRIEF SUMMARY

These and other needs in the art are addressed in one embodiment by a polymer electrolyte comprising a crosslinked self-assembly of a polymerizable salt surfactant, wherein the polymer electrolyte includes nanopores and wherein the polymer electrolyte has a conductivity of at least $1.0 \times 10^{-6}$ S/cm at $25°$ C.

In another embodiment, these and other needs in the art are addressed in a method of making a polymer electrolyte comprising providing a polymerizable salt surfactant. The method further comprises crosslinking the polymerizable salt surfactant to form a nanoporous polymer electrolyte.

The present invention relates to a dimensionally stable fast ion conductor that does not depend on polymer segmental motion for ion transport. Thus, it can operate over a wide temperature range, such as, for example, $-40$ to $85°$ C. The ion transport is facilitated by site-to-site hopping between extremely closely spaced and ordered anion sites. As a result, this material has good low temperature ionic conductivity. The conductivity remains virtually unchanged over this temperature range. In contrast, present polymer electrolytes lose several orders of magnitude in conductivity over the same temperature range.

The present polymerizable surfactants may be used to form a polymer electrolyte that includes nanostructures such as nanopores. Preferred nanostructures provide closely spaced lithium binding sites. The close proximity of the binding sites provides rapid site-to-site transfer of the lithium ions resulting in higher ionic conductivity. These lithium electrolytes may be made from pure polymerizable surfactants, composites of surfactants with other polymers and even mixtures of polymerizable surfactants.

The foregoing has outlined rather broadly the features and technical advantages of the present invention in order that the detailed description of the invention that follows may be better understood. Additional features and advantages of the invention will be described hereinafter. It should be appreciated by those skilled in the art that the concepts and the specific embodiments disclosed herein may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ".

The term "nanopores" or "nanoporous" refers to structured channels on the scale of 1 to 100 nm, which are capable of transporting ions.

The term "battery" means any device that is capable of storing energy and making it available in electrical form.

The term "polymerizable" describes a chemical compound capable of forming a polymeric compound.

The term "transference number" means the total fraction of charge carried across the battery separator by either the cations or the anions participating in the energy-providing electrochemical reactions. A transference number of 1.0 means that only the participating ions are being transported across the separator.

DETAILED DESCRIPTION OF THE PREFERRED EMBODIMENTS

Figure 1:
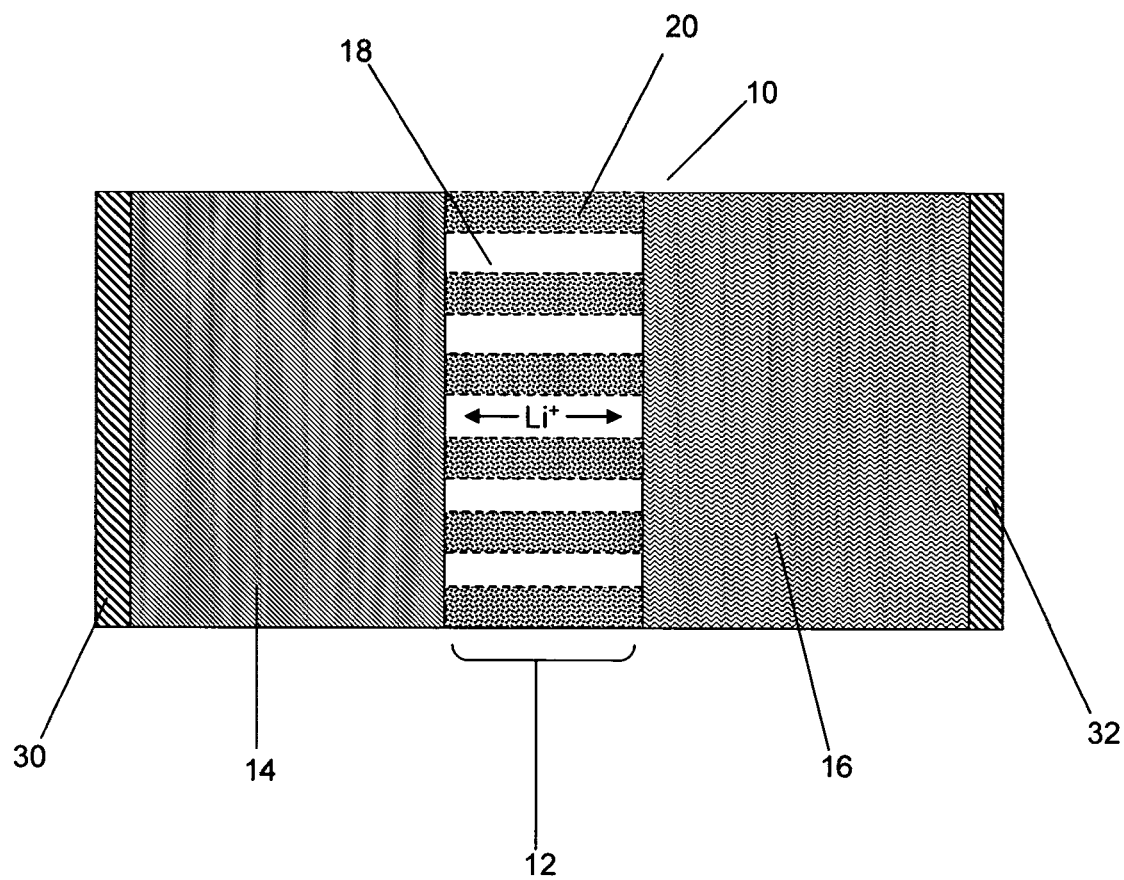
FIG. 1 illustrates an embodiment of the polymer electrolyte as a separator membrane in a lithium rechargeable battery.
Figure 2:
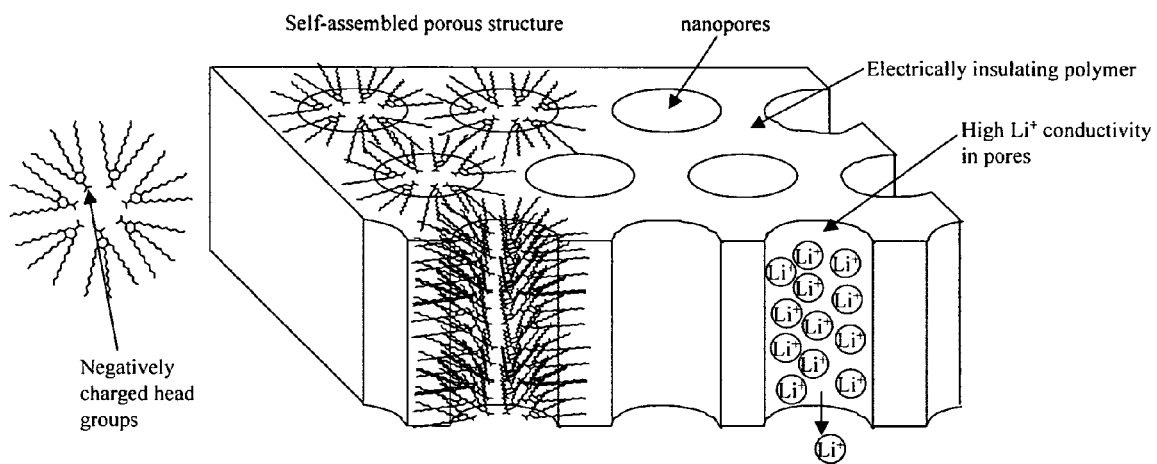
FIG. 2 illustrates a close-up view of a nanoporous, self-assembled polymer membrane for use in lithium ion batteries.
Figure 3:
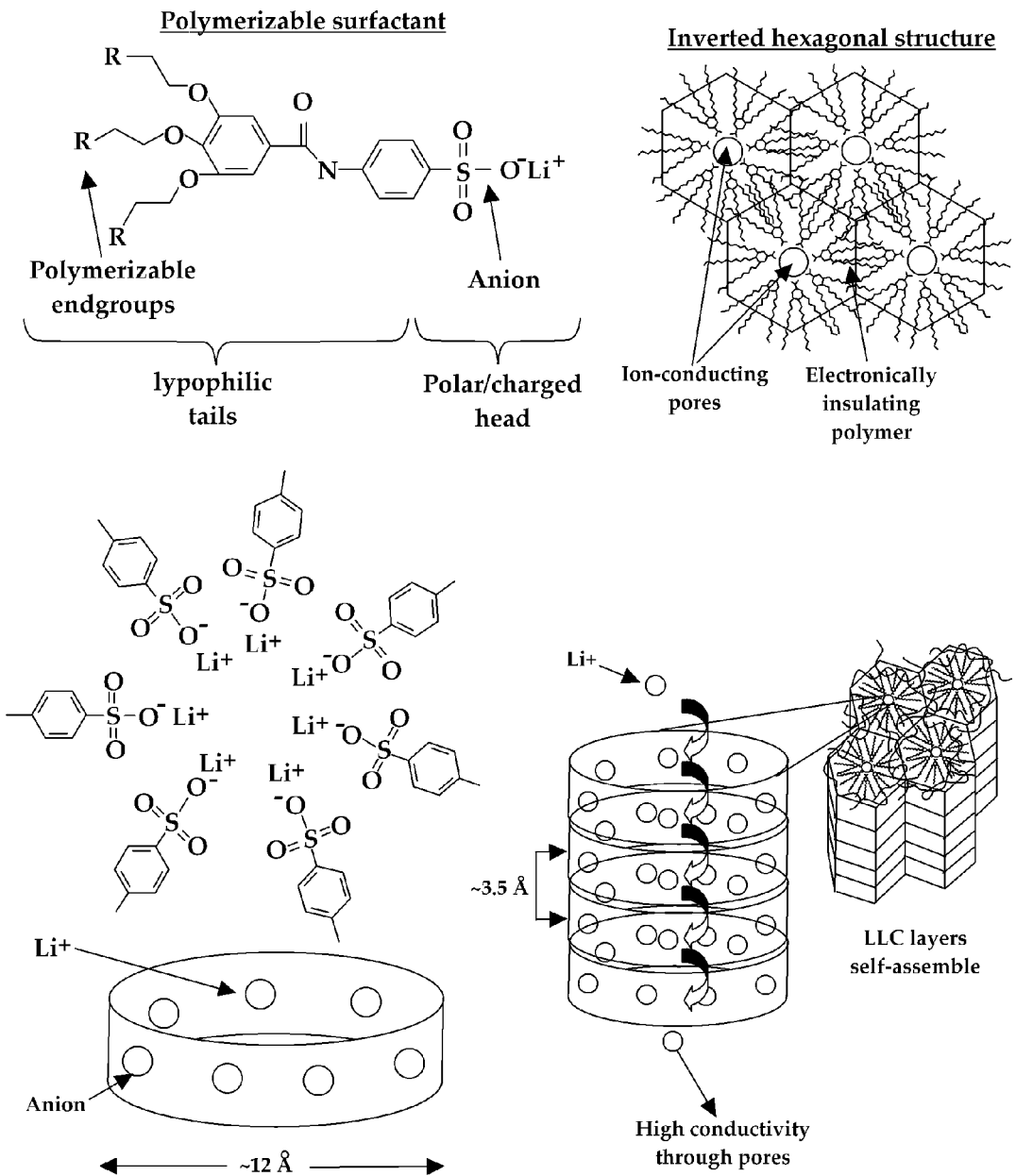
FIG. 3 illustrates the process by which polymerized surfactants self-assemble.

FIG. 1 illustrates an application of a nanoporous polymer electrolyte 12 in a battery 10. The polymer electrolyte 12 may be placed between an anode 14 and a cathode 16. Anode 14 may comprise a metal oxide such as lithium oxide, lithium cobalt oxide, lithium manganese oxides, lithium metal oxides doped with other trace metals, or any other suitable anode material. Cathode 16 may comprise a metal oxide, carbon black, and a binder. The battery may be flanked by current collectors 30 and 32. The current collectors may comprise any suitable metal such as copper or aluminum.

In certain embodiments, the polymer electrolyte 12 may comprise a self-assembling polymerizable surfactant 20. In specific embodiments, the polymerizable surfactants may contain a negatively charged or anionic head-group and one or more hydrophobic tails that may be covalently bonded by a polymerization reaction. Each hydrophobic tail may comprise a functional group that may be polymerizable. Because the charged sites are crosslinked into the polymer membrane via a polymerization reaction, only positively charged can ions be transported. Because the self-assembled molecules provide closely spaced and ordered anion sites, the membrane material may have a transport/transference number of near 1.0. In particular embodiments, the polymerizable surfactant may possess novel characteristics that allow it to self assemble into nanostructured phases and form nanopores 18. Polymers having substantially uniform nanopore sizes may be synthesized with pore diameters in a range between about 1 Angstrom to about 50 Angstroms.

Figure 4:
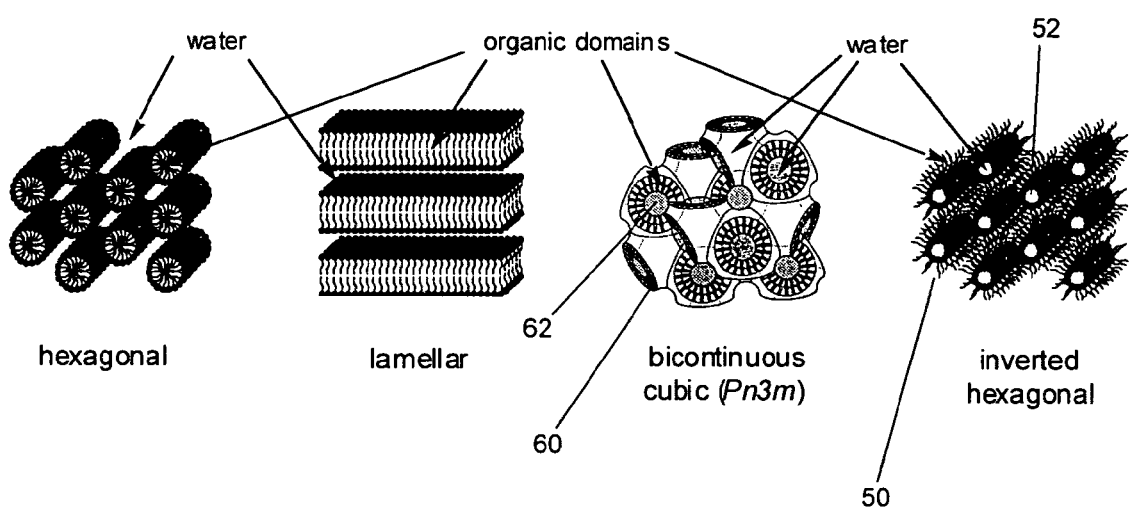
FIG. 4 illustrates various embodiments of lyotropic liquid crystal assemblies.

The polymerizable surfactants described in the invention provide a dimensionally stable fast ion conductor that does not depend on polymer segmental motion for ion transport. Instead, ion transport in the present polymer is facilitated by site-to-site hopping between the extremely closely spaced and ordered ion sites. The close proximity of the binding sites in the present polymers allows rapid site-to-site transfer of ions, resulting in higher ionic conductivity. As a result, this material can operate over a wide temperature range and has good low temperature ionic conductivity. The conductivity may remain virtually unchanged or may only change slightly over a wide temperature range The polymerizable surfactant from which the electrolyte is formed may comprise a lyotropic liquid crystal (LLC) monomer. Lyotropic liquid crystal (LLC) mesogens or monomers are amphiphilic molecules containing one or more hydrophobic organic tails and a hydrophilic headgroup. The amphiphilic character of these molecules encourages them to self-organize into aggregate structures, with the tails forming hydrophobic regions and the polar headgroups defining the interface of phase-separated domains. These aggregates may be relatively simple individual structures such as micelles and vesicles or highly ordered yet fluid condensed assemblies with specific nanometer-scale geometries known collectively as LLC phases (FIG. 4).

LLC phases are well-suited for the production of nanostructured organic materials. Their architectures may incorporate hydrophobic and hydrophilic (or charged) compounds in separate domains with well-defined nano-scale geometries, and may be especially attractive for the production of nanostructured materials, with only the caveat that LLC phases are inherently fluid and therefore lack the robustness required for most materials applications. Thus, the electrolyte materials of the present invention may use polymerizable LLC surfactants to form nanoporous polymers.

Polymerizable or crosslinkable LLC mesogens may solve the problem caused by the fluid nature of LLC assemblies. Polymerizable surfactants may comprise molecules having a pair of hydrophobic and hydrophilic components together with one or more polymerizable groups in their structure. These polymerizable surfactants may be used to form surfactant phases to produce useful materials with highly regular nano-scale architectural features (i.e. pores, etc.).

A Polymer Electrolyte Composition

Generally, embodiments of a nanoporous polymer electrolyte may comprise a polymerizable LLC salt surfactant with the following structure, $[(X)R]_n L(I)_x M$ where:

X may be any suitable polymerizable functional group;

R may be any suitable tail group;

n may be an integer signifying the number of tail groups;

I may be any suitable ionic head group having a first charge;

x may be an integer signifying the number of ionic head groups;

L may be a linking moiety that connects the one or more tail groups to the anion head group; and M may be any ion having a second charge, wherein the second charge is opposite the first charge.

The ionic head group on the surfactant, I, may comprise an anionic head group including without limitation sulfonates, fluorinated sulfonates, aromatic sulfonates, and substituted aromatic sulfonates. In particular embodiments, the anionic head group may comprise a benzene sulfonate derivative. The benzene sulfonate derivatives may comprise any number and type of substituents on the benzene ring. Examples of benzene sulfonate derivatives include without limitation, nitro aniline sulfonate, amino aniline sulfonate, methyl aniline sulfonate, amino phenol sulfonate, metanilate, or sulfanilate. Further examples of substituents that may be incorporated into the benzene sulfonate derivative include without limitation, alkyl groups, halogens, carbonyls, hydroxyls, etc. The number of ionic groups, x, is limited only by the number of available linking site on the L group. However, in many embodiments, x will equal 1.

The ionic head group may also comprise any suitable anionic fluorinated head groups. Examples of fluorinated anionic head groups include without limitation, amino difluorocarboxylates, fluorinated alkyl sulfonates, or fluorinated amino acids. Without being limited by theory, it is believed that using polymerizable surfactants with a sulfonated or fluoronated head group may result in a sufficiently higher degree of cation dissociation due to the electron withdrawing nature of the aromatic ring resulting in higher room temperature conductivity. In embodiments where the head group is anionic, the surfactant serves as a cation conductor.

Figure 22:
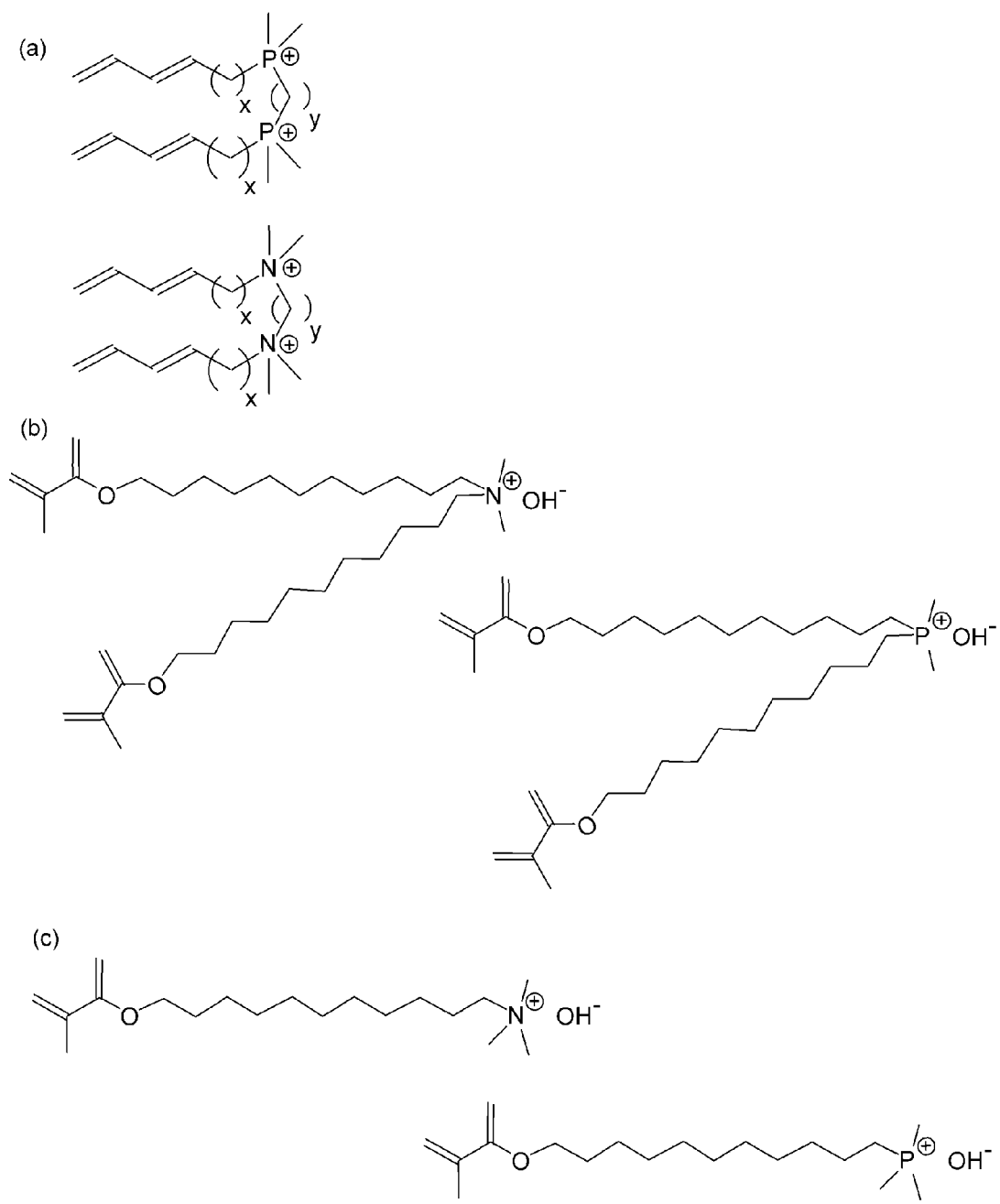
FIG. 22 shows examples of anionic surfactants.

In an alternative embodiment, I may comprise a cationic head group. Examples of suitable cationic head groups include without limitation, phosphonium or ammonium. In such embodiments, the resulting polymer serves as an anion conductor. In certain embodiments with cationic head groups, a "Gemini" structure may be formed, in which the surfactant comprises two cationic head groups and two tail groups, R (See FIGS. 22 and 23). In such cases, the cationic surfactant may have the following general Gemini structure:

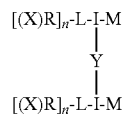

Y may be any group capable of connecting the ionic head groups. Generally, Y may comprise an aliphatic chain or group. The chain may comprise from 1 to 10 carbon atoms, alternatively 6 carbon atoms. Other examples of suitable Y groups include without limitation, alkanes, alkenyl chains, aromatics, and combinations thereof.

The I group may have a first charge that is positive or negative. The first charge may comprise any amount of charge such as 1+, 2+, 3+, 1−, 2−, 3−, etc. In preferred embodiments, the I group has either a 1+ or 1− charge. The M group preferably has a second charge that is the opposite of the first charge. In other words, if the I group comprises a positive charge, the M group comprises a negative charge. The amount of the first charge does not necessarily have to be equal to the second charge. In particular embodiments, the M group may comprise a charge that is greater than 1+ or less than 1− and the I group may comprise a 1+ or 1− charge. In such embodiments, a plurality of surfactants may share each M group. By way of example only, the M group may be $Mg^{2+}$ and the I group may be an aromatic sulfonate with a 1− charge. In this case, two surfactants with a 1− charge may share a single $Mg^{2+}$ cation.

The linking moiety, L, may comprise any appropriate group or molecule that is capable of connecting I with the one or more tail groups. In some embodiments, L may comprise a single alkylene group or a multiple alkylene chain. i.e., $(-CH_2-)_n$. In other embodiments, L may comprise an ether linkage, i.e., $-CH_2-O-CH_2-$. Furthermore, L may comprise an amine linkage group, i.e., $-NH-$. In select embodiments, L may comprise a cyclic or aromatic group. In particular, L may comprise a benzyl group, a cyclohexyl group, a halo-benzyl group, a phenyl group, a phenacyl group, an aniline group, a benzoyl group, a benzoyloxy group, a benzyloxycarbonyl group, a nitrobenzoyl group, or a nitrobenzyl group. Moreover, L may comprise combinations or derivatives of the aforementioned linkers.

R may comprise any suitable hydrophobic tail group. For example, R may comprise a hydrocarbon chain containing between 1 and 30 carbon atoms, alternatively between 5 and 20 carbons, or between 8 and 15 carbons. R may also comprise an unsaturated hydrocarbon chain of alkenyl groups, i.e., $(-CH=CH-)$. R may optionally comprise various combinations of heteroatoms and functional groups such as ether linkages (O), amine linkages ($-NH-$), amide linkages ($-NH-CO-$), carbonyl linkages ($-CO-$), and combinations thereof.

In addition, the LLC salt surfactant may comprise one or more RX groups. In other words, n may equal 1, 2, 3, etc. Typically, the LLC salt surfactant will include three RX tail groups. In other embodiments, the polymerizable surfactant may comprise two tail groups. The number of tail groups, RX, is typically limited only by the number of linkages available to L, the linking moiety. In certain embodiments with more than one tail group, each R group may comprise different chain lengths.

When I comprises an anionic head group, M may comprise any cation capable of forming a salt. Suitable cations include alkali metals such as $Na^+$, $Li^+$, $K^+$, $Rb^+$, or $Cs^+$ cations. Other suitable cations may also comprise an alkaline earth metal including without limitation, $Be^{2+}$, $Mg^{2+}$, $Ca^{2+}$, $Sr^{2+}$, or $Ba^{2+}$ cations. Additionally, M may comprise a transition metal cation including without limitation, $Ag^+$, $Ni^{2+}$, $Ni^{3+}$, $Cd^{3+}$, or $Zn^{2+}$. In other embodiments, the cation may comprise protons, $H^+$. Alternatively, M may comprise an anion when I comprises a cationic head group. Examples of suitable anions include without limitation, hydroxyls, halides, acetates, carboxylates, halogenated carboxylates, polyoxymetalates, or benzoates. For example, M may comprise $OH^-$ or $Br^-$.

X may comprise any polymerizable functional group. As defined herein, polymerizable functional group means any chemical moiety that is capable of being crosslinked or covalently bonded with another chemical moiety with some form of initiation. Examples of appropriate functional groups include without limitation, acrylates, methacrylates, dienes, alkynyl groups, allyl groups, vinyl groups, acrylamides, hydroxyl groups, fumarate groups, isocyanates, styrenes, terminal olefins, or combinations thereof. In embodiments where the LLC monomer comprises more than one tail group, R, the polymerizable functional group, X, may be the same for each tail group. In other embodiments, X may be different for each tail group, R.

The LLC salt surfactant may be synthesized by any reaction pathway known to one skilled in the art. However, the polymerizable salt surfactant generally may be synthesized from the reaction of an acid chloride with a salt precursor. The acid chloride may comprise a benzoyl chloride derivative. According to one embodiment, the acid chloride may be synthesized from the reaction of a benzoic acid derivative with a chloride compound. For example, a benzoic acid derivative may be reacted with thionyl chloride. Another example of chlorides that may be used is oxalyl chloride.

The salt precursor generally comprises a sulfonate derivative and a cation. The sulfonate derivative may generally have the same structure as the eventual I group in the polymerizable salt surfactant product. Examples of suitable sulfonate derivatives include without limitation, metanilate, sulfanilate, nitro aniline sulfonate, amino aniline sulfonate, methyl aniline sulfonate, or amino phenol sulfonate. In alternative embodiments, the salt precursor may comprise a fluorinated amino acid derivative with a base. An example of a fluorinated amino acid derivative includes $\alpha,\alpha$-difluoro-$\beta$-alanine. The base typically may contain the desired $M^+$ cation. As an example, a salt precursor may comprise a lithium cation and a sulfanilate (see Example 1).

The nanoporous structure of the electrolyte forms spontaneously because lyotropic liquid crystals or polymerizable surfactants self-assemble into complex and highly ordered molecular assemblies. The LLC amphiphiles may aggregate into the same types of assemblies as their non-polymerizable analogues, but may also be capable of being covalently linked to their nearest neighbors in situ to form robust polymer networks that retain the original structure. Micelles, inverse micelles, and microemulsions may be polymerized with retention of phase microstructure. Lamellar assemblies such as vesicles, lipid microtubules and the lamellar (L) phase may also be successfully polymerized. Several complex phases may also be polymerized, including the normal hexagonal phase (HI), the inverted hexagonal phase (HII), and the bi-continuous cubic (QII, Pn3m) phase.

Some typical phases that lyotropic liquid crystals may form are shown in FIG. 4. In some embodiments, the LLC salt monomer may form inverted hexagonal 50 and bi-continuous cubic phases 60; of which both phases may form continuous porous pathways for cation transport. A porous polymer film of the inverted hexagonal phase 50 may have pore channels 52 aligned randomly (see FIG. 4), but with enough of them aligned roughly normal to the surface of the film to form continuous diffusion pathways for cations (see FIG. 1). The bi-continuous cubic phase 60 may form a 3-dimensional network of interconnected pores 62. However, specific alignment of the pores is not required in order to form continuous channels.

The phase structure (self-assembled crystal structure) may be evaluated using x-ray diffraction. The inverted hexagonal structure (and hexagonal structures in general) generates a characteristic X-ray diffraction pattern. For hexagonal phases, the $d_{100}$ plane and the $d_{110}$ plane generate X-ray reflections at an interval of $$1 : \frac{1}{\sqrt{3}} : \frac{1}{\sqrt{4}} : \text{etc.}$$

Figure 5:
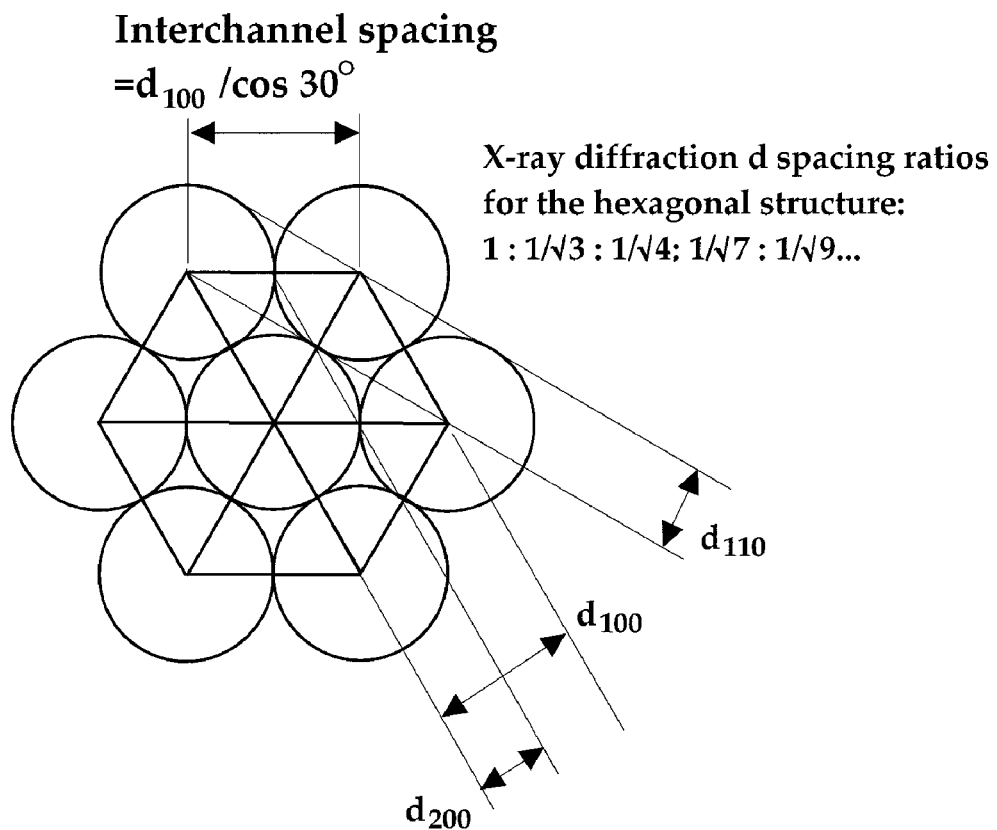
FIG. 5 illustrates the X-ray diffraction of a hexagonal structure.

FIG. 5 illustrates the x-ray scattering for a hexagonal crystal structure. Lamellar structures exhibit x-ray reflection at intervals of $1:1/2:1/3$: etc. Cubic phases exhibit x-ray reflections at intervals of $$\frac{1}{\sqrt{6}} : \frac{1}{\sqrt{8}}.$$

Figure 6:
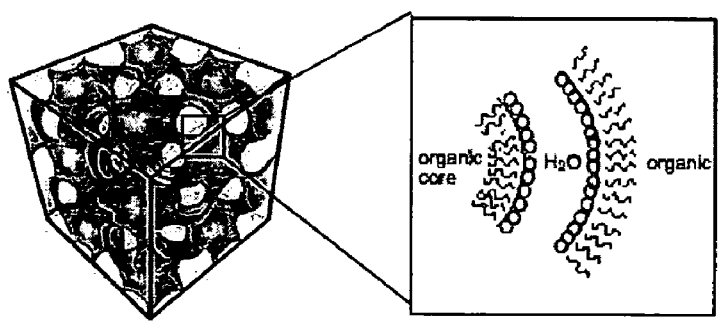
FIG. 6 illustrates the structure of a cubic phase.
Figure 7:
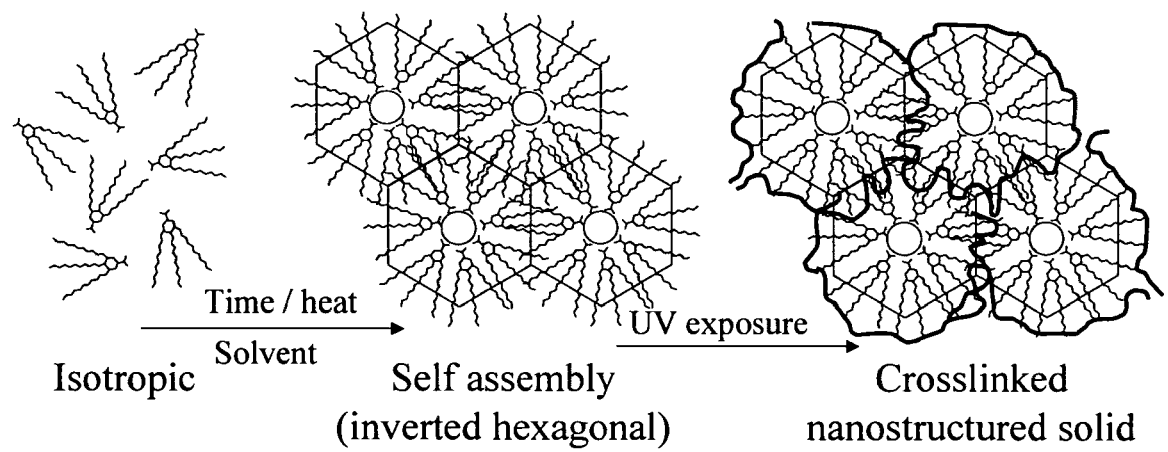
FIG. 7 illustrates the self-assembly process for forming nanostructured materials from polymerizable surfactants.

There are several geometric variations of the cubic phase. A typical structure is shown in FIG. 6. X-ray diffraction allows for unequivocal confirmation of the phase structure and is particularly useful for distinguishing between lyotropic liquid crystals in the lamellar, hexagonal and cubic phases.

B. Polymer Electrolyte Fabrication.

The polymerizable LLC salt surfactants of the present invention may be crosslinked or polymerized into a variety of configurations to form a polymer electrolyte. The polymerizable surfactants may be crosslinked in a mold to form a desired shape. In another embodiment, the polymerizable surfactants may be cast as a film or coating on to any substrate and crosslinked to form the polymer electrolyte. Examples of suitable substrates include without limitation, steel, metal, polymer, composites, or combinations thereof. In another embodiment, the polymerizable surfactants may first fill or partially fill the pores of a macroporous polymer membrane support and then may be crosslinked to form the polymer electrolyte. The polymerizable surfactant may be dissolved in a suitable solvent to create a casting solution. Examples of suitable solvents include without limitation, tetrahydrofuran, acetonitrile, hexane, acetone, water, dichloromethane, ethyl acetate, toluene or chloroform. Once cast on to the substrate, the solvent may be allowed to evaporate leaving the polymerizable surfactant film. The polymerizable surfactant may be cast by any means such as wet-film draw down, spraying, dip coating, or spin coating. The film may then be crosslinked by a variety of methods.

In particular embodiments, the polymerizable surfactant self-assemblies may be polymerized or crosslinked to form a solid, nanoporous polymer electrolyte. In some embodiments, the LLC monomer or polymerizable salt surfactant may be photopolymerized by irradiation with light over a wide temperature range. The wavelength of light that may be used to crosslink the polymer electrolyte may range from about 300 nm to about 500 nm. In particular, UV light may be used. The photopolymerization may be facilitated by the addition of a photoinitiator. Examples of suitable photoinitiators include without limitation, benzophenone, isopropyl thioxanthone, benzyl dimethyl ketal, acylphosphine oxides, or combinations thereof. Alternatively, the polymerizable LLC salt monomers may be crosslinked using a chemical initiator. Examples of suitable chemical initiators include without limitation benzoyl peroxide ammonium persulfate, or peroxides. In other embodiments, the salt monomers may be crosslinked via thermal crosslinking, i.e., the application of heat. For thermal crosslinking, a thermally activated initiator may be used such as 2-2'-azo-bis-isobutyrylnitrile (AIBN). In yet other embodiments, the polymerizable surfactants may be crosslinked via electron-beam irradiation.

In further embodiments, a crosslinking agent may be added to the polymerizable salt surfactant to increase the crosslinking density and/or mechanical properties of the polymer electrolyte. However, it is to be understood that the polymerizable surfactant may be crosslinked without the need for either crosslinking agent or initiator. The crosslinking agent may comprise any compounds having polymerizable functional groups. Examples of suitable crosslinking agents include without limitation, ethylene glycol dimethacrylate derivatives, ethylene glycol diacrylate derivatives, methylenebisacrylamide derivatives, divinylbenzene, or combinations thereof.

The polymer electrolytes formed by the above methods are expected to have conductivities at 25° C. of at least $1 \times 10^{-6}$ S/cm, more preferably at least $2 \times 10^{-6}$ S/cm, and still more preferably at least $1 \times 10^{-5}$ S/cm. At $-35°$ C., the present polymer electrolyte are expected to have conductivities of at least $1 \times 10^{-6}$ S/cm, more preferably at least $2 \times 10^{-6}$ S/cm, and still more preferably at least $1 \times 10^{-5}$ S/cm.

The mechanical properties of the polymer electrolyte may be modified by making composites of hydrophobic polymers and lyotropic liquid crystals or polymerizable surfactants. By way of example only, linear polymers may be incorporated into the structures formed by the polymerizable surfactants. Examples of linear polymers include, without limitation, butyl rubber, halobutyl rubber, butadiene rubber, neoprene rubber, styrene-butadiene rubber, poly(propylene oxide), poly(vinylchloride), poly(propylene), poly(ethylene), poly(acrylates), poly(methacrylates), poly(styrene), poly(amides), polyesters, poly(lactic acid), poly(glycolic acid), or combinations thereof. The resulting material may be more flexible than the polymerized surfactants without linear polymers.

To further illustrate various illustrative embodiments of the present invention, the following examples are provided.

EXAMPLE 1

Preparation of Lithium Sulfanilate Salt Monomer

This example details the preparation of a polymerizable surfactant containing a lithium salt headgroup, which may be used to make polymer lithium electrolytes.
Preparation of Acid Chloride Precursor First, an acid chloride is prepared as depicted in step 1 of FIG. 8. All glassware was heated in an oven at 110° C. for 2 hours, and all anhydrous solvents were further dried with molecular sieves and purged with argon for 10 min, prior to the synthesis. First, 3,4,5-tris(11'-acryloyloxyundecyloxy) benzoic acid (1.09 g, 1.3 mmol) and a trace amount of 2,6-di-tert-butyl-4-methylphenol stabilizer were dissolved in anhydrous $CH_2Cl_2$ (25 mL) in a 50 mL Schlenk flask under an argon atmosphere. Thionyl chloride (0.57 mL, 7.8 mmol) was then injected by syringe directly into the solution with constant stirring. The flask was covered with aluminum foil, and the mixture was continually stirred for an overnight.

The solvent and the excess thionyl chloride were then removed under reduced pressure at room temperature for 4 h (using a water bath to obtain room temperature and an additional trap to isolate thionyl chloride) to afford a yellow oil. This oil was used as the starting material in the final step.
Preparation of Sulfanilate Lithium Salt Precursor Next, a sulfanilate lithium salt precursor is prepared according to step 2 in FIG. 8. Sulfanilic acid (1.35 g, 7.8 mmol) and LiOH (0.187 g, 7.8 mmol) were added in water (10 mL) with constant stirring. This step results in an available lone pair of electrons on the amino group to react with the acid chloride at the next and final step. After stirring 20 min, the clear solution was then dried in vacuum overnight to obtain a dried sulfanilate lithium salt precursor. The solid was used as the starting material in the final step.

Figure 8:
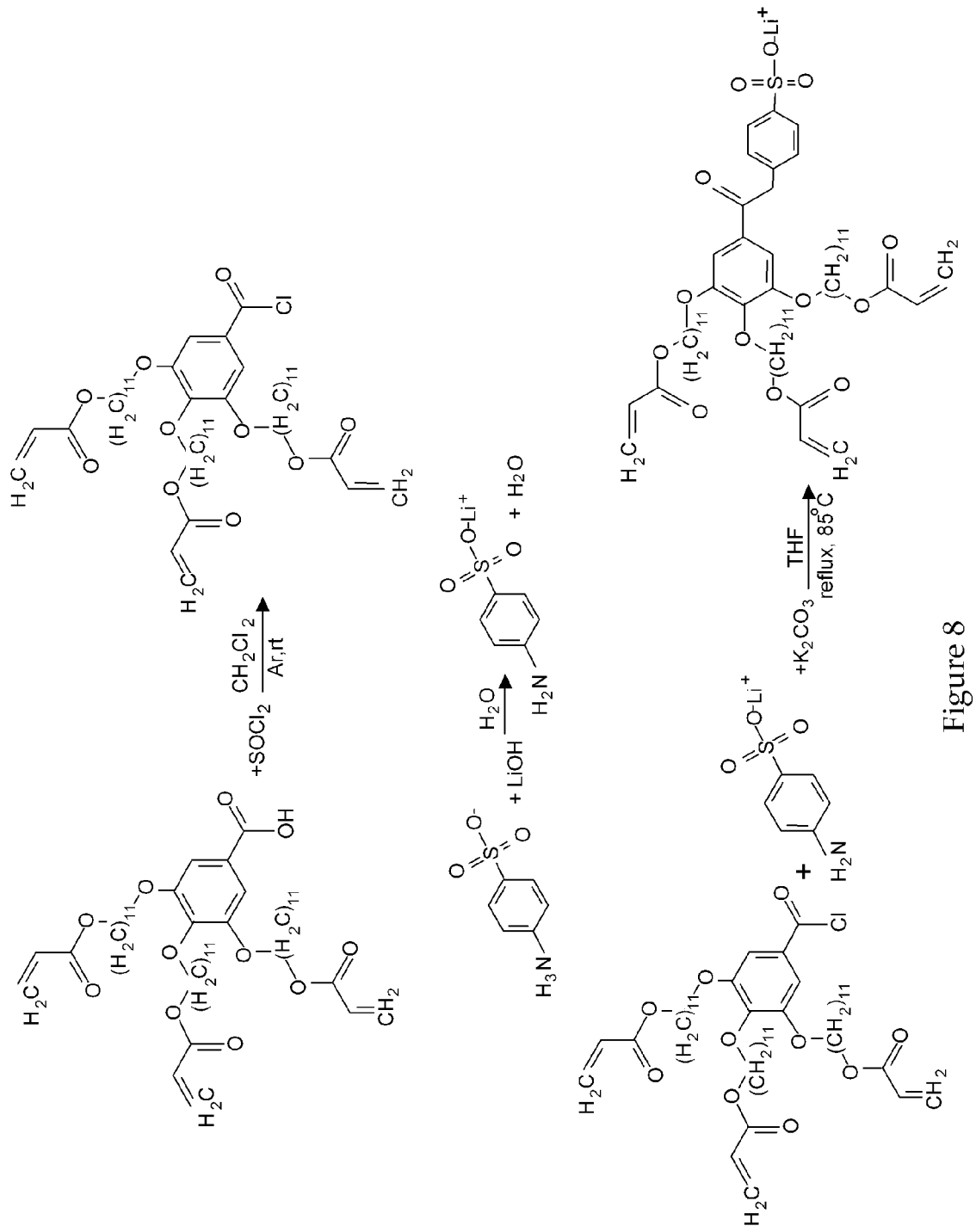
FIG. 8 illustrates the preparation of a lithium sulfanilate salt monomer.

Once the lithium salt precursor and the acid chloride are prepared, the lithium sulfanilate salt monomer can be synthesized as shown in step 3 of FIG. 8. The prepared acid chloride oil from step 1 was dissolved in THF (100 mL, regular grade). Potassium carbonate (1.08 g, 7.8 mmol) was then added to the solution to neutralize any inorganic acidic products from step 1. The mixture was stirred for 10 minutes. Next, sulfanilate lithium salt precursor (prepared from step 2) was added, and the mixture was heated to reflux (65° C.) in air overnight. Lastly, the insoluble solid was filtered and discarded. The clear pale yellow solution was then dried using rotary evaporator. The solid product was further dried under reduced pressure at room temperature for 48 h to afford a pure lithium sulfanilate salt monomer. The lithium salt product (about 1 g) was then dissolved in chloroform containing 5 wt % 1-hydroxycyclohexylphenylketone (7 g, w 0.536%) to make up the casting solution mixture (w 12.5%) for casting films of the lithium electrolyte.

Figure 9:
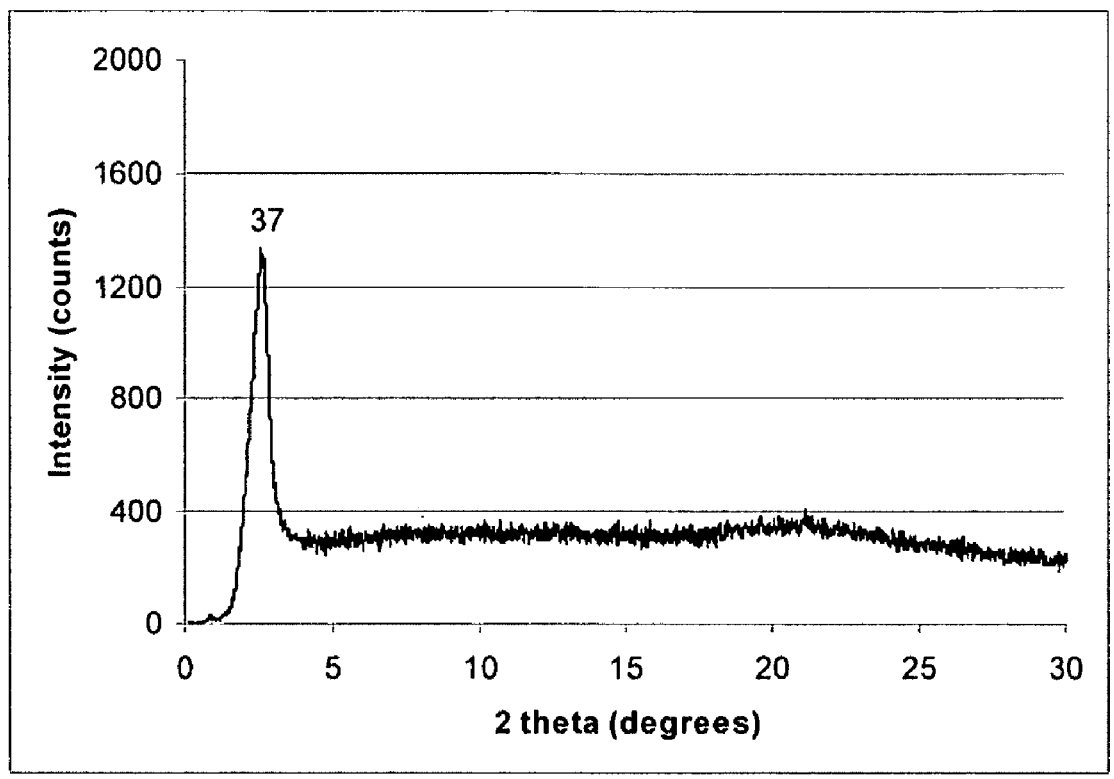
FIG. 9 is an X-ray diffraction spectrum of a lithium sulfanilate salt monomer.

A sample of the lithium sulfanilate salt monomer was prepared for X-ray diffraction to identify if any liquid crystal order was present. The X-ray diffraction (XRD) spectrum in FIG. 9 indicates that there is most likely hexagonal ordering with a $d_{100}$ repeat distance of 37 Angstroms. Without any secondary peak, it was not possible to unequivocally identify the crystal structure, However, the $d_{100}$ spacing was much closer to that of an analogous sodium salt (see example 3) of 35.5 than the lamellar phase of the acid, which had a primary spacing of 43.5 (see example 2/step 2). Based on geometric arguments, the structure of the lithium sulfanilate salt monomer was most likely hexagonal.

EXAMPLE 2

Preparation of a Sodium Sulfanilate Headgroup Polymerizable Surfactant

This sodium sulfanilate surfactant is a variation of the lithium polymerizable surfactant in Example 1. The XRD spectrum of this sulfanilic acid polymerizable surfactant was used to help identify the phase structure for the material in Example 1.

Figure 10:
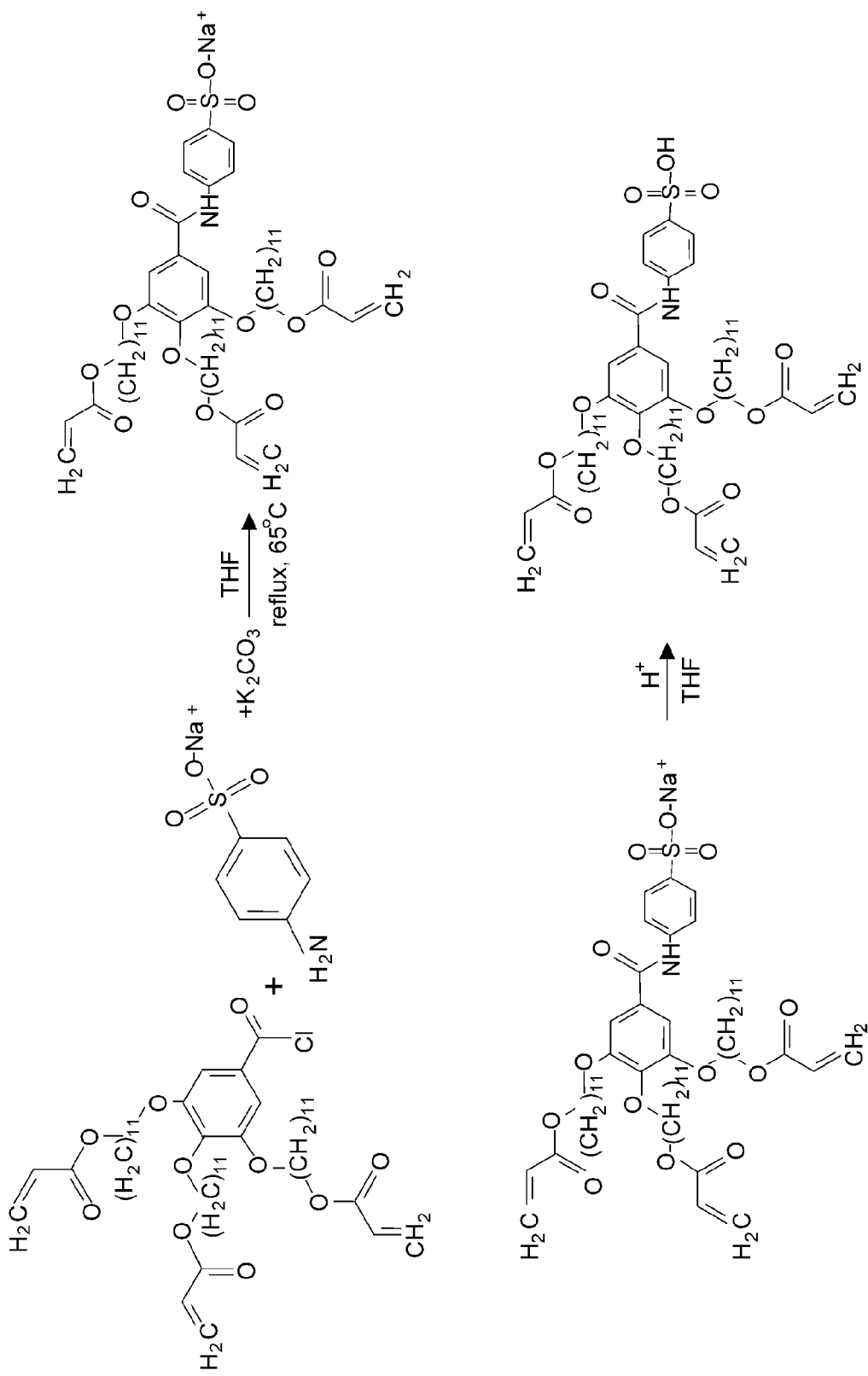
FIG. 10 illustrates the preparation of a sulfanilic acid polymerizable surfactant.
Figure 11:
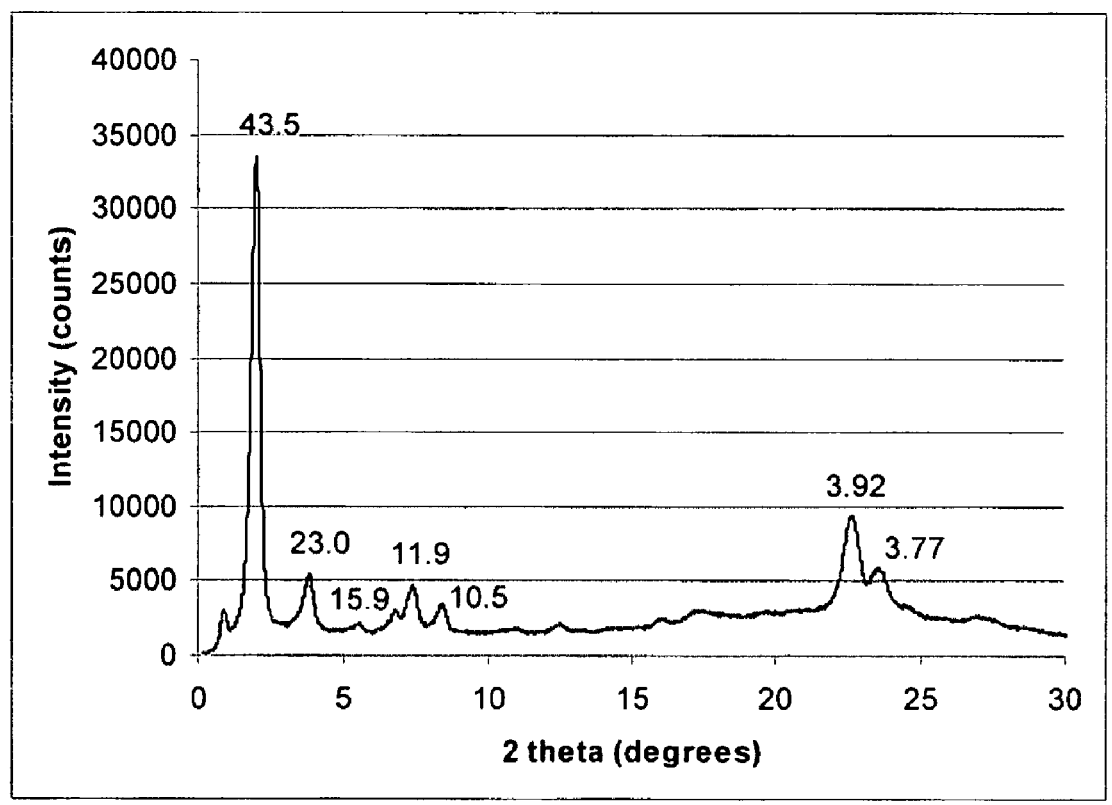
FIG. 11 is an X-ray diffraction spectrum of the sulfanilic acid polymerizable surfactant.
Figure 12:
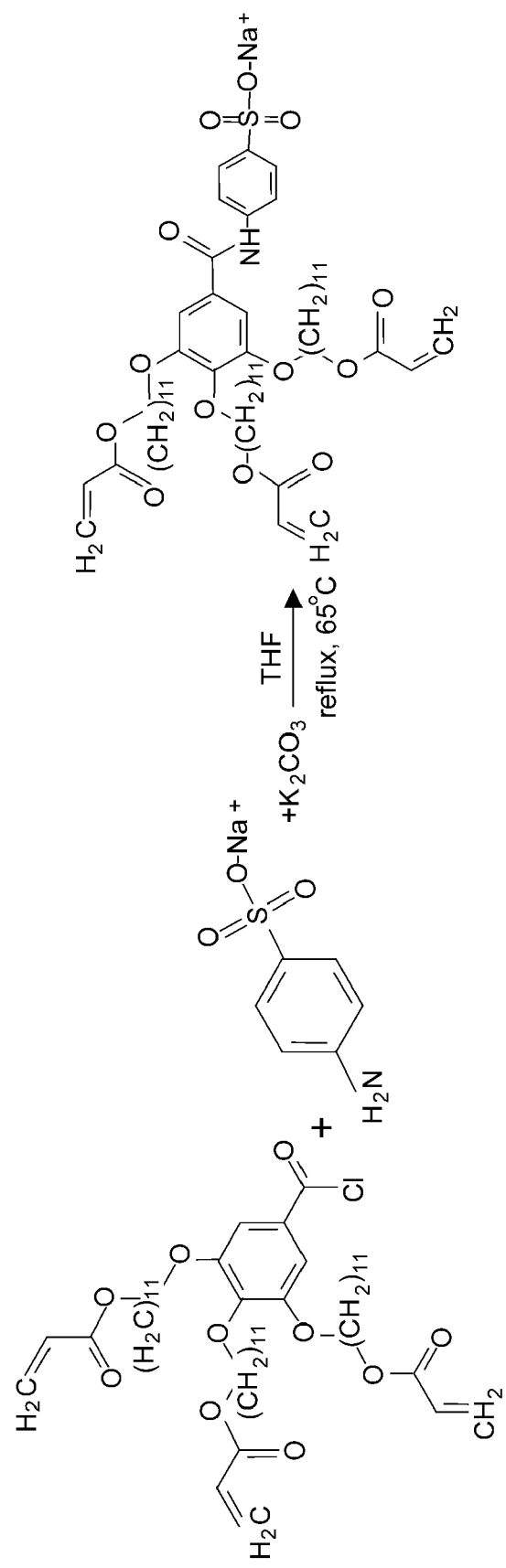
FIG. 12 illustrates the preparation of a polymerizable sodium sulfanilate surfactant.
Figure 13:
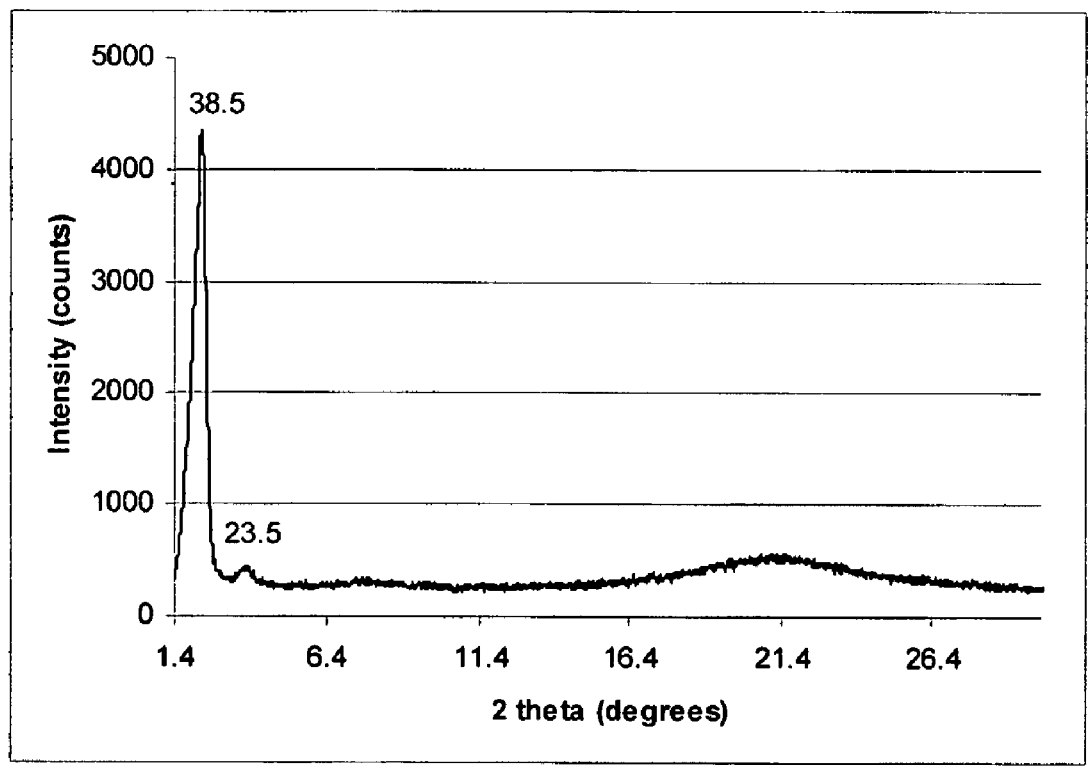
FIG. 13 is an X-ray diffraction spectrum of a sodium sulfanilate salt monomer described in Example 2.

The acid chloride precursor was identical to the compound described in step 1 of Example 1. To prepare the sodium sulfanilate salt monomer, the prepared acid chloride oil was dissolved in THF (100 mL, Aldrich 178810) (see FIG. 10). Potassium carbonate (1.08g, 7.8 mmol) was then added to the solution to neutralize any inorganic acidic products from previous step. The mixture was stirred for 10 minutes. Next, sulfanilate sodium salt (1.52 g, 7.8 mmol, Aldrich 251283) was added, and the mixture was heated to reflux (65° C., in air) overnight. The insoluble solid (excess potassium carbonate and sulfanilate sodium salt) was then filtered and discarded. The clear pale yellow solution was finally acidified by passing through a column packed with acidic ion-exchange resin in the following step.

A sample of the sodium sulfanilate salt monomer was prepared for X-ray diffraction to identify if any liquid crystal order was present. The following X-ray diffraction spectrum indicates that there is a clear hexagonal ordering (inverted hexagonal based on geometry of the surfactant) with a $d_{100}$ spacing distance of 38.5 Angstroms (secondary peak at 23.5 roughly $1/\sqrt{3}*38.5$).

EXAMPLE 3

Preparation of the Sulfanilic Acid Liquid Crystal Monomer

The liquid crystal monomer may be synthesized by running the sodium polymerizable surfactant of Example 2 through an ion-exchanger resin. The sodium sulfanilate surfactant was synthesized by following steps 1 and 2 in Example 2.

The acidic ion-exchange column was prepared from AG 50W-X8 Resin (100 g, Bio-Rad, 143-5451) in THF. The resin was first stirred in a solution of HCl (200 mL, 6M) for 3 h. The first HCl solution was then removed, and the resin was continually stirred in a second solution of HCl (200 mL, 6M) for 3 h. The second HCl solution was then removed, and the resin was finally stirred in a third solution of HCl (200 mL, 6M) for 12 h. The slurry gel was then packed in a column (3 cm diameter), washed with excess water to remove HCl, and then washed with THF (150 mL) to completely remove water from the column. Next, the sodium salt solution in THF was passed through the acidic ion-exchange resin. The THF was finally removed under vacuum at about 40° C. to collect an oily liquid. The oil was further dried under reduced pressure at room temperature to afford a pure sulfanilic acid monomer as a pale yellow solid.

A sample of the sulfanilic acid liquid crystal monomer was prepared for X-ray diffraction to identify if any liquid crystal order was present. The following X-ray diffraction spectrum indicates that there is some lamellar ordering with a repeat distance of 43.5 Angstroms (secondary peak at 23.0 roughly $1/2*43.5$, and tertiary peak at 15.9 roughly $1/3*43.5$). The matching of the secondary and tertiary peaks did not exactly line up with the expected lamellar peaks, but they were closer to lamellar than the other possible phase, hexagonal. There were also additional peaks indicating crystal ordering.

EXAMPLE 4

Casting and Testing Lithium Electrolyte Films

Polyethylene Oxide, PEO, Lithium Salt Films

Lithium salt and PEO solutions were wet cast onto stainless steel sheets (2 mm thickness) using a 4-mil draw down knife. The solutions contained 21.4% solids and therefore the 4 mil wet films dried leaving a 0.856 mil coating. (Equivalent to 21.4 μm coatings). The solvent was evaporated under ambient room conditions in a fume hood.

Specifically, lithium trifluoromethanesulfonate (1 g, 6.41 mmol) was dissolved in 5 mL of THF. In another container, poly(ethylene oxide) (6.41 mL, 7.24 g, Mv=100,000 amu) was dissolved in 25 mL of $CHCl_3$. The two solutions were then mixed and the THF was evaporated to form a 1M $CF_3SO_3Li$ in PEO electrolyte.

The electrolyte and solvent solution was then coated onto a stainless steel shim (2-mil thickness) using a 4-mil draw-bar. A piece of coated stainless steel (area=1 $cm^2$) was assembled into CR2025 coin cell battery parts using an internal wave spring and spacer disk to insure proper contact with both ends of the battery coin cell. The electrolyte film contained in the stainless steel battery assembly was tested using potentiostatic electrical impedance spectroscopy (EIS).

Figure 14:
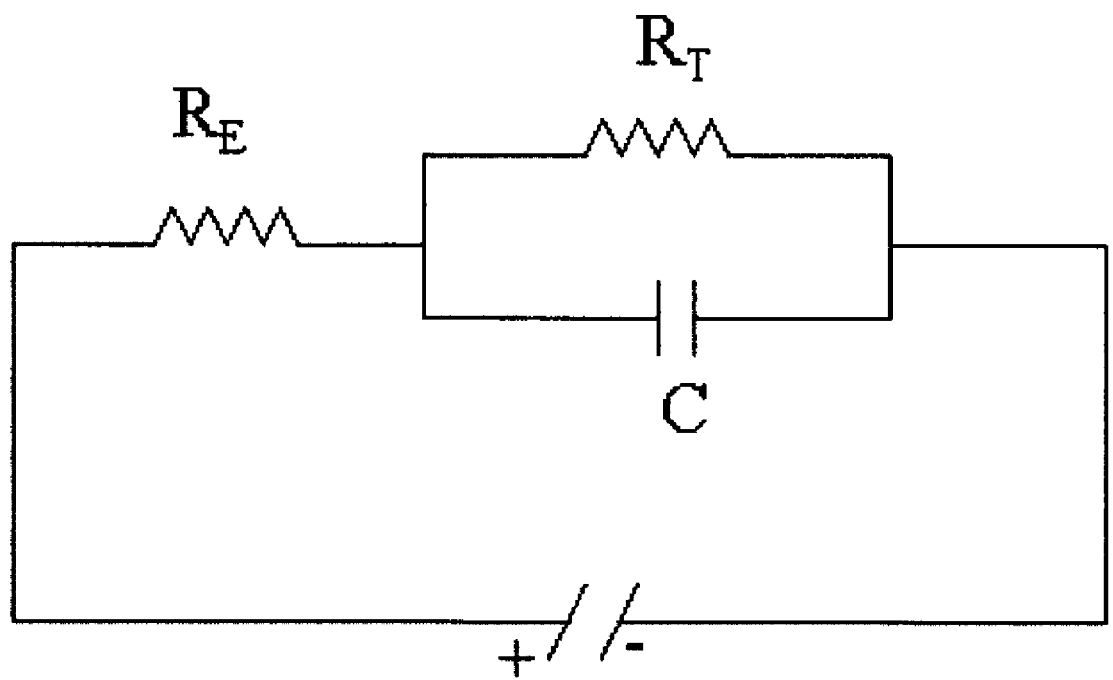
FIG. 14 shows the equivalent circuit used to analyze the electro impedance spectroscopy (EIS) data.

An equivalent circuit was used to evaluate the electrolyte resistance (FIG. 14). $R_E$ is the electrolyte (ionic) resistance, $R_T$ is the charge transfer resistance and C is the capacitance (at low frequency).

Figure 15:
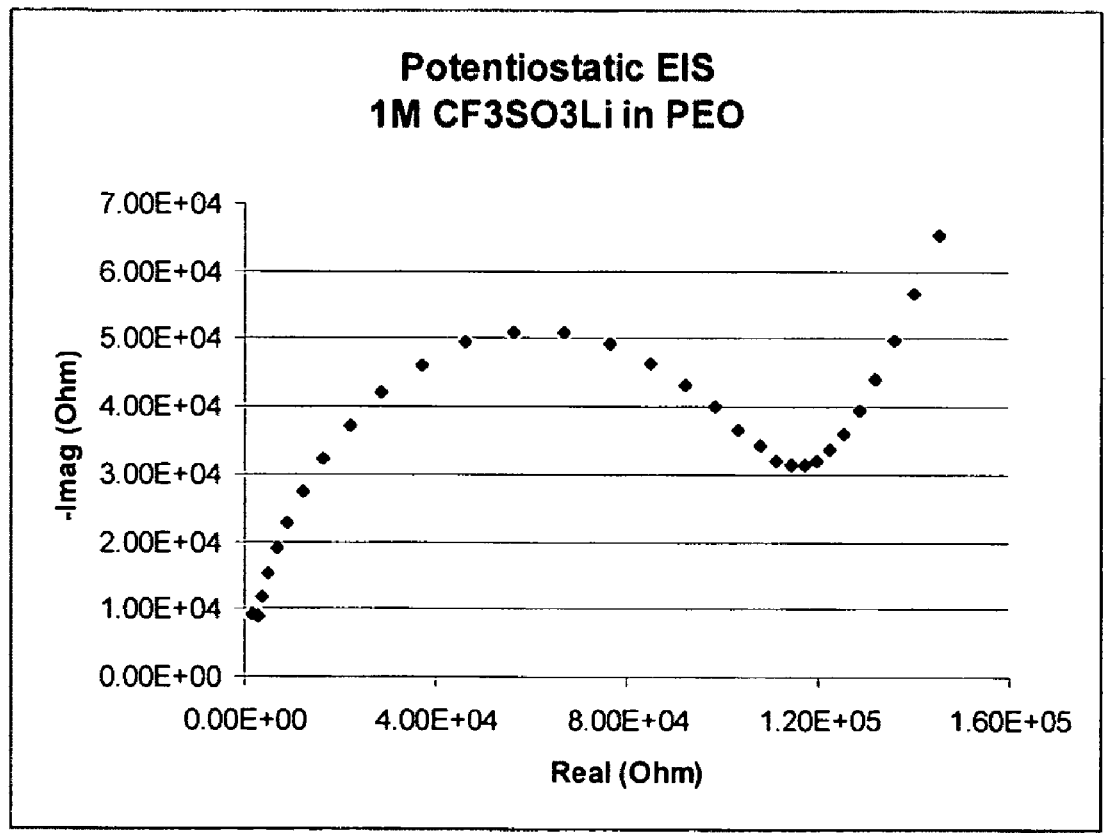
FIG. 15 is the Nyquist plot for the data obtained by EIS for the polymer electrolyte described in Example 4, part A.

Based on the equivalent circuit, the model fit to the data gave the following values: $R_E$=2339Ω, RT=$1.17*10^5$Ω, and C=$2.19*10^{-10}$ F. The Nyquist plot of the data is shown in FIG. 15.

The electrolyte conductivity is calculated using the equation: $\sigma=t/(A*R_E)$, where t is the thickness of electrolyte film, and A is the area of the electrolyte film. Thus for t=0.00214 cm and A=1 $cm^2$, Ω=$9\times10^{-7}$ S/cm (at 22° C.). This is consistent with published values for lithium conductivity in PEO in the absence of any solvent or plasticizer [Handbook of Batteries, 3rd Ed., David Linden and Thomas B. Reddy, editors, McGraw-Hill, New York, 2002, pg 34.15.]

Polymerizable Surfactant Films

The lithium salt (sulfanilate) polymerizable surfactant from Example 1 (1 g) was dissolved in $CHCl_3$ containing 5% 1-hydroxycyclohexylphenylketone (7 g, w 0.536%) to make up a casting solution with 12.5 wt % polymerizable surfactant.

Figure 16:
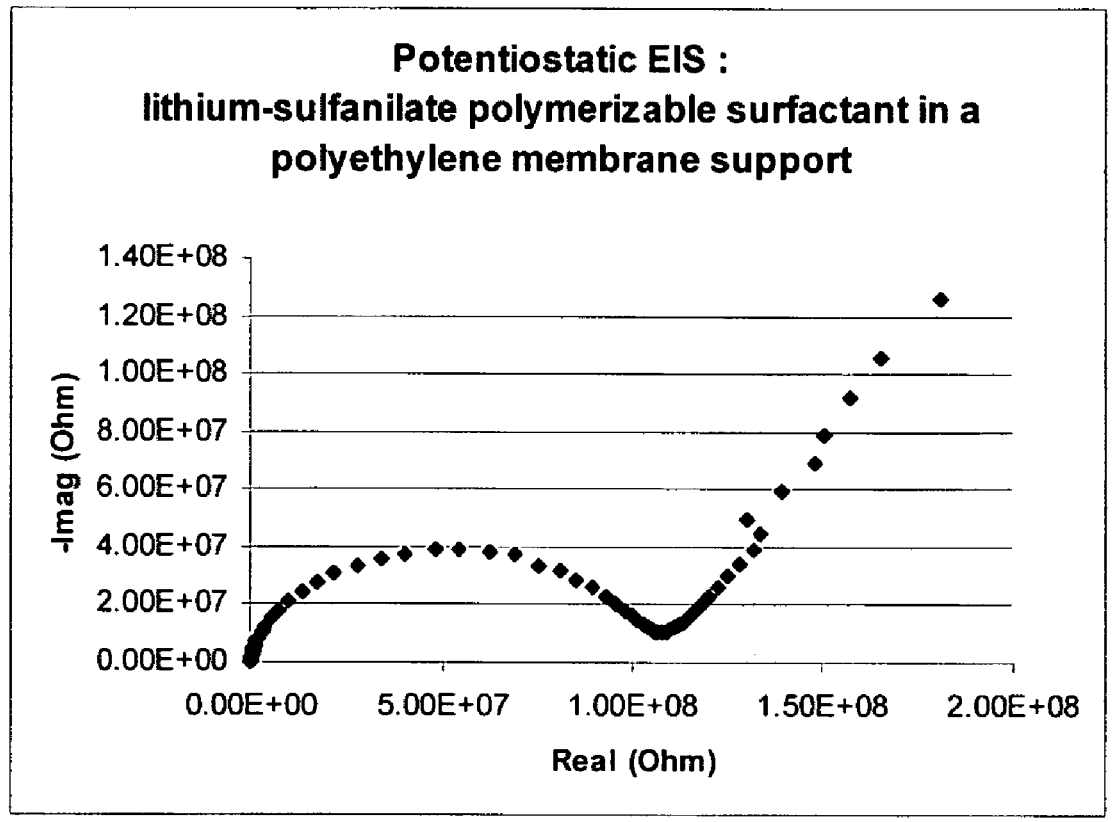
FIG. 16 is the Nyquist plot for the data obtained by EIS for the polymer electrolyte described in Example 4, part B.

A drop of this electrolyte solution was then pipetted onto a piece of a microporous non-woven ultra-high molecular weight polyethylene membrane support. (DSM Solutec-membrane trade name of "Solupor". The membrane thickness was 20 microns (pore size=0.8 μm, porosity=82%). The solution was absorbed by the membrane and the solvent was allowed to evaporate. The previously white membrane was now transparent. The polymerizable surfactants that were filled inside the support membrane were crosslinked under ultra-violet light (50 mW/$cm^2$ 320-500 nm for 10 minutes, under a nitrogen atmosphere) using a commercial spot curing apparatus (Novacure 2100, EXFO). After photopolymerization the membrane was transparent and still flexible. The membrane was inserted inside a CR2025 coin cell battery housing (with a wave spring and spacer disk) and analyzed by potentiostatic EIS. Base on the equivalent circuit (FIG. 14), $R_E$=1261Ω, $R_T$=$1.02*10^8$Ω, C=$1.36*10^{-10}$ F. The Nyquist plot from the EIS is shown in FIG. 16. Thus, the lithium ion conductivity is $\sigma$=$1.58\times10^{-6}$ S/cm (at 22° C.). The same coin cell (with this electrolyte) was analyzed at −35° C., and the conductivity was measured to be $\sigma$=$2.7\times10^{-6}$ S/cm (at −35° C.).

EXAMPLE 5

Sulfanilic Acid Lithium Salt with Diene Polymerizable Groups

Preparation of Pyridinium Chloro Chromate

Figure 17:
FIG. 17 illustrates the initial preparation of a bromo diene precursor for synthesis of a polymerizable surfactant with diene functional groups.
Figure 17:
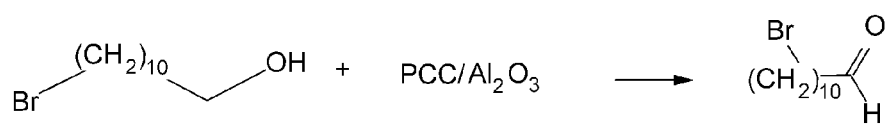
Figure 17:
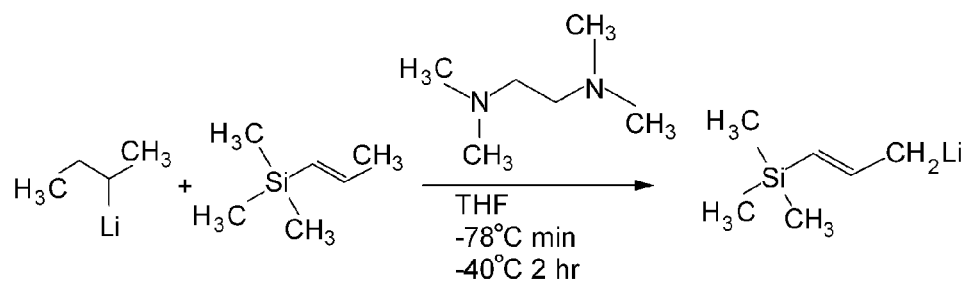
Figure 17:
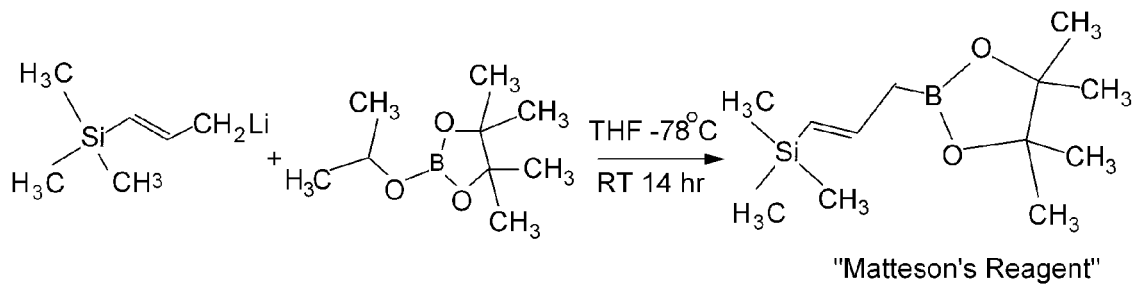
Figure 17:
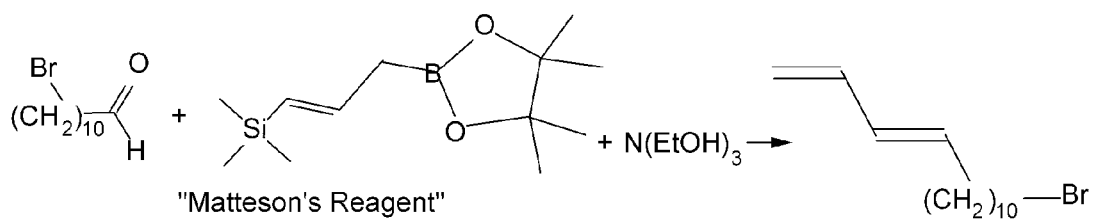

Chromium (VI) oxide (48 g, 0.48 mol) was dissolved in 6M HCl (88 mL, 0.53 mol) at 40° C. to form an orange solution. (See FIG. 17). The solution was then cooled to 10° C., and pyridine (38.8 mL, 0.48 mol) was added to the solution. A yellow orange precipitate was slowly formed. After the solution was heated to 40° C., the precipitate was dissolved. Aluminum oxide basic (380 g, 3.73 mol) was added to the solution, and the mixture was stirred well with a stir rod. The resulting solid was dried under vacuum and stored under argon atmosphere.

Preparation of 11-Bromo-undecanal

11-Bromo-1-undecanol (16.08 g, 0.0640 mol) and PCC/$Al_2O_3$ (110.0 g, 0.104 mol) were combined and placed in a 3-neck round-bottom flask equipped with a mechanical stir bar under an argon atmosphere. Anhydrous $CH_2Cl_2$ (200 mL) was added to the flask, and the reaction mixture was stirred at room temperature for 16 hours. (See FIG. 17).

Diethyl ether (60 mL) was then added to dilute the reaction mixture. Using fritted filter funnel with Florisil (60-100 mesh), the solid was filtered and washed with diethyl ether (200 mL). The organic solvents were finally removed under vacuum at about 40° C. to collect an oily liquid product.

Preparation of Matteson's Reagent

All glassware was heated in an oven at 110° C. for 2 hours, and all anhydrous solvents were further dried with molecular sieves and purged with argon for 10 min, prior to the synthesis.

To a 500 mL 3-neck round bottom flask equipped with a stir bar and an addition funnel, a solution of N,N,N',N'-tetramethylethylenediamine (19.6 mL, 0.13 mol) in 80 mL of anhydrous THF was cooled to −78° C. under argon purge with an acetone/dry ice bath. (See FIG. 17). Then, 1.3M sec-BuLi solution (100 mL, 0.13 mol) was added to the solution. Allyltrimethylsilane (20.7 mL, 0.13 mol) was mixed with 20 mL of anhydrous THF and added dropwise to the flask from the addition funnel. The temperature was kept at −78° C. for 30 min. Then, the temperature was slowly raised to but not higher than −40° C. in the course of 2 hours by controlling the amount of dry ice in the acetone bath.

To another 1000 mL 3-neck round bottom flask equipped with a mechanical stir bar, a solution of 2-isopropoxy-4,4,5,5-tetramethyl-1,3,2-dioxaborolane (26.5 mL, 0.13 mol) in 60 mL of anhydrous THF was cooled to −78° C. under argon purge with an acetone/dry ice bath. The lithiated solution was then transferred to the 1000 mL flask through a cannula. The mixture was allowed to warm up to room temperature and stirred for 14 hours.

The clear product solution was next added to a mixture of saturated aqueous $NH_4Cl$ (150 mL), 1M HCl (150 mL), and $CH_2Cl_2$ (300 mL). The mixture was extracted with diethyl ether (300 mL), and the organic fraction was washed with $H_2O$ (3×150 mL) and brine, NaCl and water (1×100 mL). The organic fraction was dried with $MgSO_4$, filtered, and the solvent was evaporated in vacuum at about 40° C. to afford the crude product. After fractional distillation under reduced pressure at 75° C. water bath, the pure product was collected as a clear colorless liquid.

Synthesis of 14-Bromo-tetradeca-1,3-diene

To a 250 mL round-bottom flask, 11-Bromo-undecanal (4.98 g, 20.0 mmol) was dissolved in 100 mL of diethyl ether. Matteson's reagent (6.71 g, 28.0 mmol) was then added, and the reaction mixture was stirred at room temperature for two days. During this time, the flask was covered with aluminum foil. (See FIG. 17).

Next, triethanolamine (4.56 g, 30.0 mmol) was added to the solution, and the mixture was stirred for an additional 2 h, and a white precipitate formed. After decantation, the organic solution was washed with saturated $NaHCO_3$ (2×50 mL) and brine, NaCl and water (2×50 mL). The organic fraction was dried with $MgSO_4$, filtered, and the solvent was evaporated in vacuum at about 40° C. to afford an oily liquid.

To another 250 mL round-bottom flask, the resulting oily liquid was mixed with THF (20 mL) and concentrated $H_2SO_4$ (3 drops). The reaction mixture was stirred at room temperature for 16 h. During this time, the flask was covered with aluminum foil.

The reaction mixture was then diluted with hexane (50 mL), washed with $H_2O$ (1×50 mL) and brine, NaCl and water (1×50 mL). The organic fraction was dried with $MgSO_4$, filtered, and the solvent was evaporated in vacuum at about 40° C. to afford the crude product. The resulting crude product was purified by silica gel (230-400 Mesh) column chromatography (100% hexane) to afford a clear, colorless liquid.

Preparation of 3,4,5-tris((11,13-tetradecadienyl)oxy)benzoic acid

Figure 18:
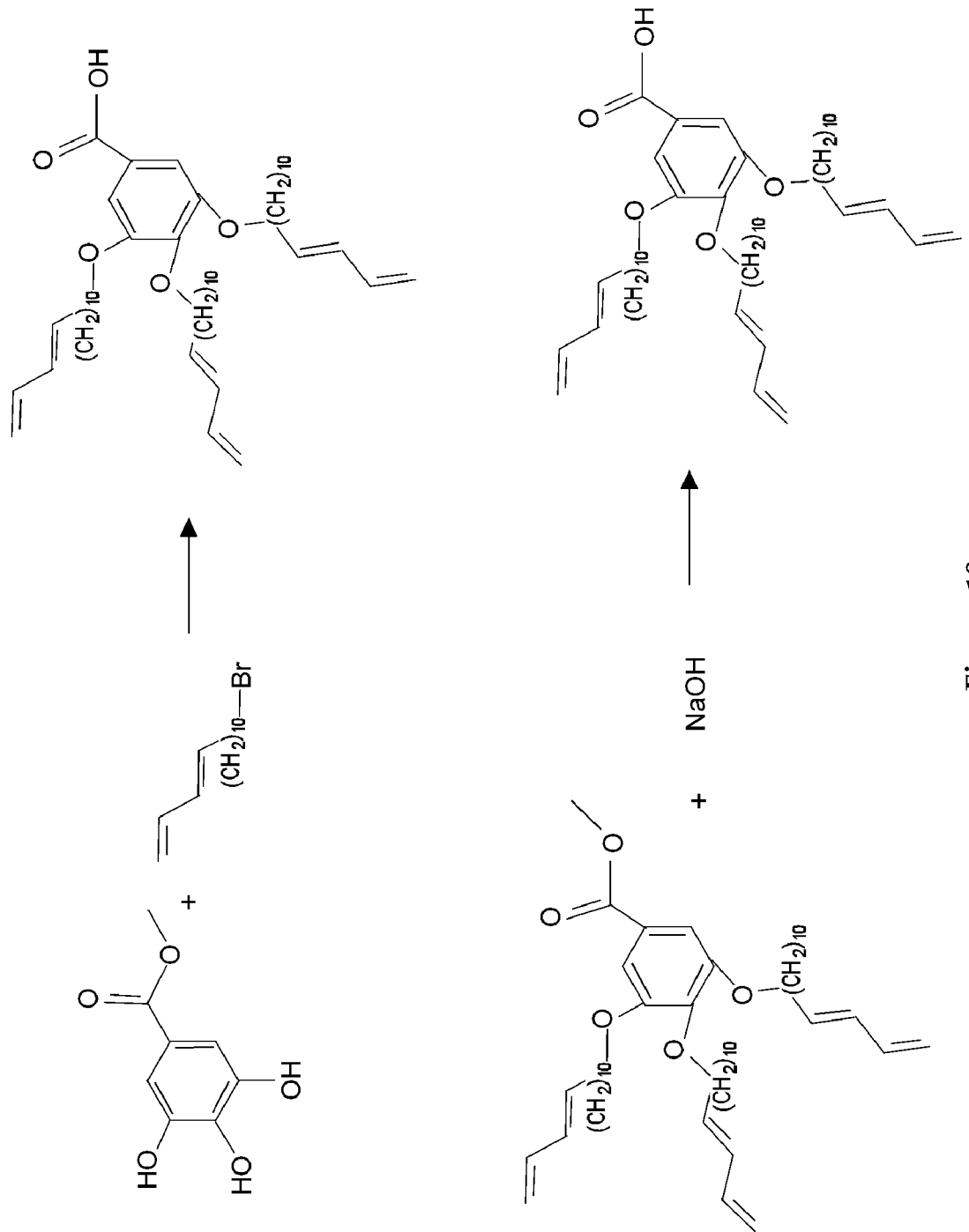
FIG. 18 illustrates the preparation of a polymerizable surfactant with diene functional groups.
Figure 18:
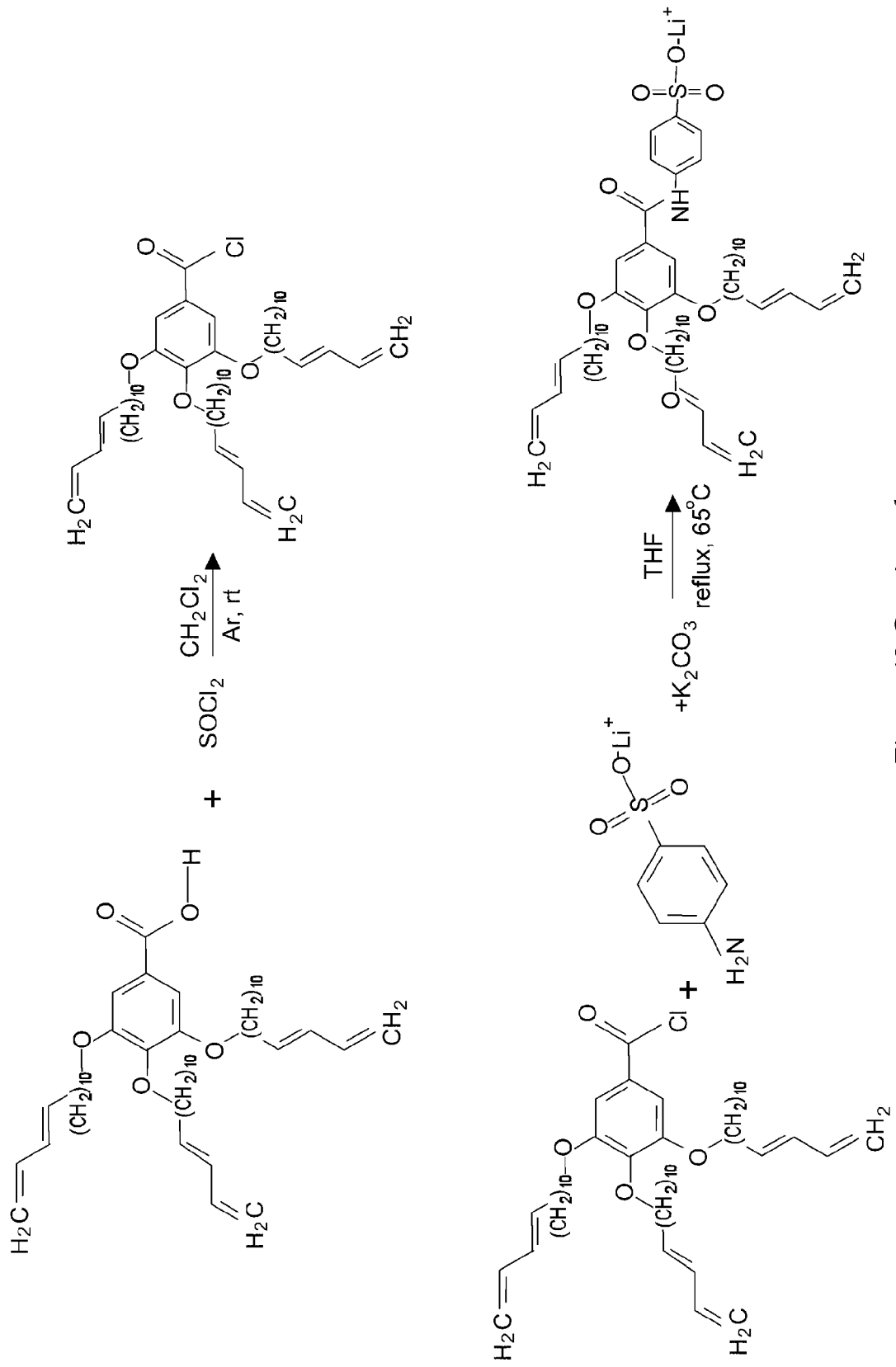

As illustrated in FIG. 18, methyl 3,4,5-trihydroxybenzoate (2.11 g, 11.4 mmol) and 14-bromo-tetradeca-1,3-diene (10.0 g, 36.6 mmol) were dissolved in methyl ethyl ketone (200 mL) in a round-bottom flask. Potassium carbonate (17.4 g, 126 mmol) was added to the flask and the flask was fitted with a reflux condenser. The mixture was continually stirred at 90° C. for 48 hours. The solution was then allowed to cool to room temperature, and the insoluble solid was filtered and washed with ethyl acetate (2×200 mL). The supernatant liquor and ethyl acetate used to wash the insoluble solid were combined and extracted with $H_2O$ (3×200 mL). The organic phase was then separated, dried with $MgSO_4$, filtered, and the solvent was evaporated in vacuum at about 40° C. to afford a yellow oily liquid. The oil was used in the next step without further purification.

In the next step as shown in FIG. 18, the yellow oil prepared above, 3,4,5-tris((11,13-tetradecadienyl)oxy)benzoate, was dissolved in a solution of ethanol (400 mL), $H_2O$ (80 mL), and NaOH (3.21 g, 80.2 mmol) in a round-bottom flask equipped with a reflux condenser and a magnetic stir bar. The mixture was then stirred and refluxed at 80° C. for 12 hours. After this period, the solution was cooled to 0° C. using an ice bath and acidified to pH 5.0 with hydrochloric acid (42 mL, 3M) to afford a pale brown precipitate. The precipitate was then filtered, washed with hexane (2×100 mL), and dried overnight under vacuum to collect a white solid.

Preparation of the Tri-diene Acid Chloride

All glassware was heated in an oven at 110° C. for 2 hours, and all anhydrous solvents were further dried with molecular sieves and purged with argon for 10 min, prior to the synthesis. First, 3,4,5-tris((11,13-tetradecadienyl)oxy)benzoic acid (1.09 g, 1.46 mmol) and a trace amount of 2,6-di-tert-butyl-4-methylphenol stabilizer were dissolved in anhydrous $CH_2Cl_2$ (25 mL) in a 50 mL Schlenk flask under an argon atmosphere. Thionyl chloride (0.64 mL, 8.76 mmol) was then injected by syringe directly into the solution with constant stirring. The flask was covered with aluminum foil, and the mixture was continually stirred overnight.

Preparation of Sulfanilate Lithium Salt Precursor

The seventh step is equivalent to Example 1, step 2.

Preparation of Lithium Sulfanilate Salt Monomer

The prepared acid chloride oil (prepared from step 1) was dissolved in THF (100 mL, regular grade). Potassium carbonate (1.21 g, 8.76 mmol) was then added to the solution to neutralize any inorganic acidic products from step 1. The mixture was stirred for 10 minutes.

Next, sulfanilate lithium salt precursor (prepared from step 2) was added, and the mixture was heated to reflux (65° C.) in air overnight. Lastly, the insoluble solid was filtered and discarded. The clear pale yellow solution was then dried using rotary evaporator. The solid product was further dried under reduced pressure at room temperature for 48 h to afford a pure lithium sulfanilate diene salt monomer. The lithium salt product (about 1 g) was then dissolved in 1-hydroxycyclohexylphenylketone/THF solution (7 g, w 0.536%) to make up solution for casting films of the lithium electrolyte onto membrane supports.

EXAMPLE 6

Linear Polymerizable Surfactants that Form the Bi-Continuous Cubic Phase for Nanoporous Polymer Lithium Electrolytes There are several relatively simple lipid surfactants which may form a cubic phase. Of notable interest are sodium dodecylsulfate (forming a cubic phase at 64% surfactant, 36% polar solvent, at 45 to 90° C.), potassium dodecanoate (forming a cubic phase at 66% surfactant, and at 20° C.) and potassium tetradecanoate (forming a cubic phase at 62% surfactant, and at 100° C.). The surfactants may also form the cubic phase with a variety of other cations such as lithium.

Figure 19:
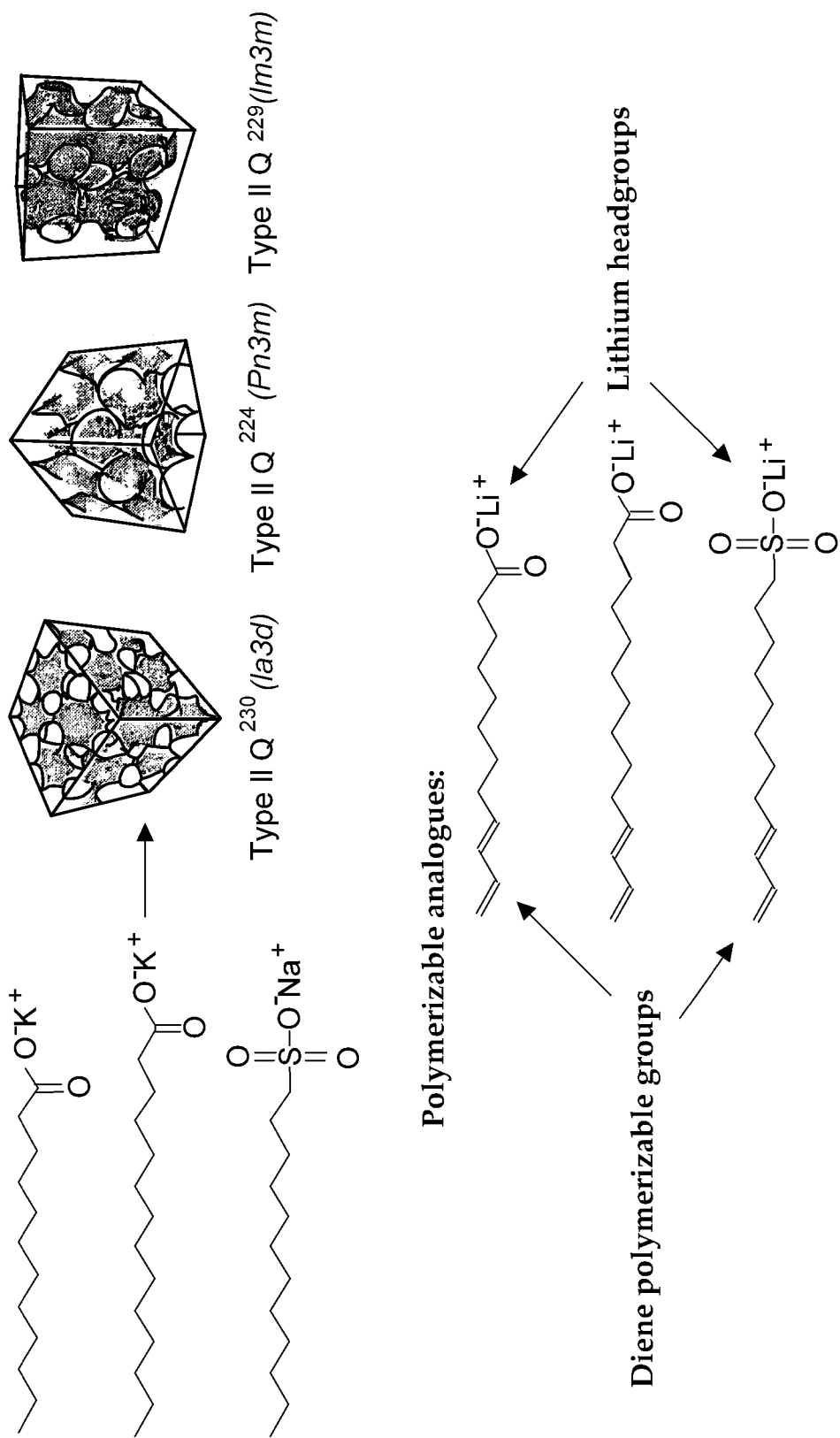
FIG. 19 shows examples of cubic phase forming surfactants and analogous cubic phase forming polymerizable surfactants.

The surfactants that may be formed from the proposed polymerizable analogues are shown in FIG. 19. The use of diene reactive groups may minimize potential reactivity of chemical bonds in the surfactant with lithium metal (a potential anode material in lithium rechargeable batteries), however acrylate and methacrylate versions may also be possible. Additional potential cubic phase forming polymerizable surfactants are shown in FIG. 20.

EXAMPLE 7

Polymerizable Surfactants with Fluorinated Headgroups for Lithium Ion Polymer Electrolytes Polymerizable surfactants containing fluorinated sulfonic acid head groups may also be excellent lithium conductors due to the electron withdrawing nature of the fluorine atoms, which makes the charge on the base site weaker allowing the lithium greater dissociation and mobility. The procedure for making the fluorinated surfactants is based on published work by Marchand-Brynaert herein incorporated by reference (A Cheguillaume, S Lacroix, and J Marchand-Brynaert, "A practical synthesis of 2,2-difluoro-3-amino-propanoic acid ($\alpha,\alpha$-difluoro-$\beta$-alanine), Tetrahedron Letters 44 (2003) 2375-2377) and a reaction known as the Reformatsky-type reaction. This synthetic approach was developed for use in medicinal chemistry because the fluorinated amino acid has utility as an 18F-labeled radiopharmaceutical.

Figure 20:
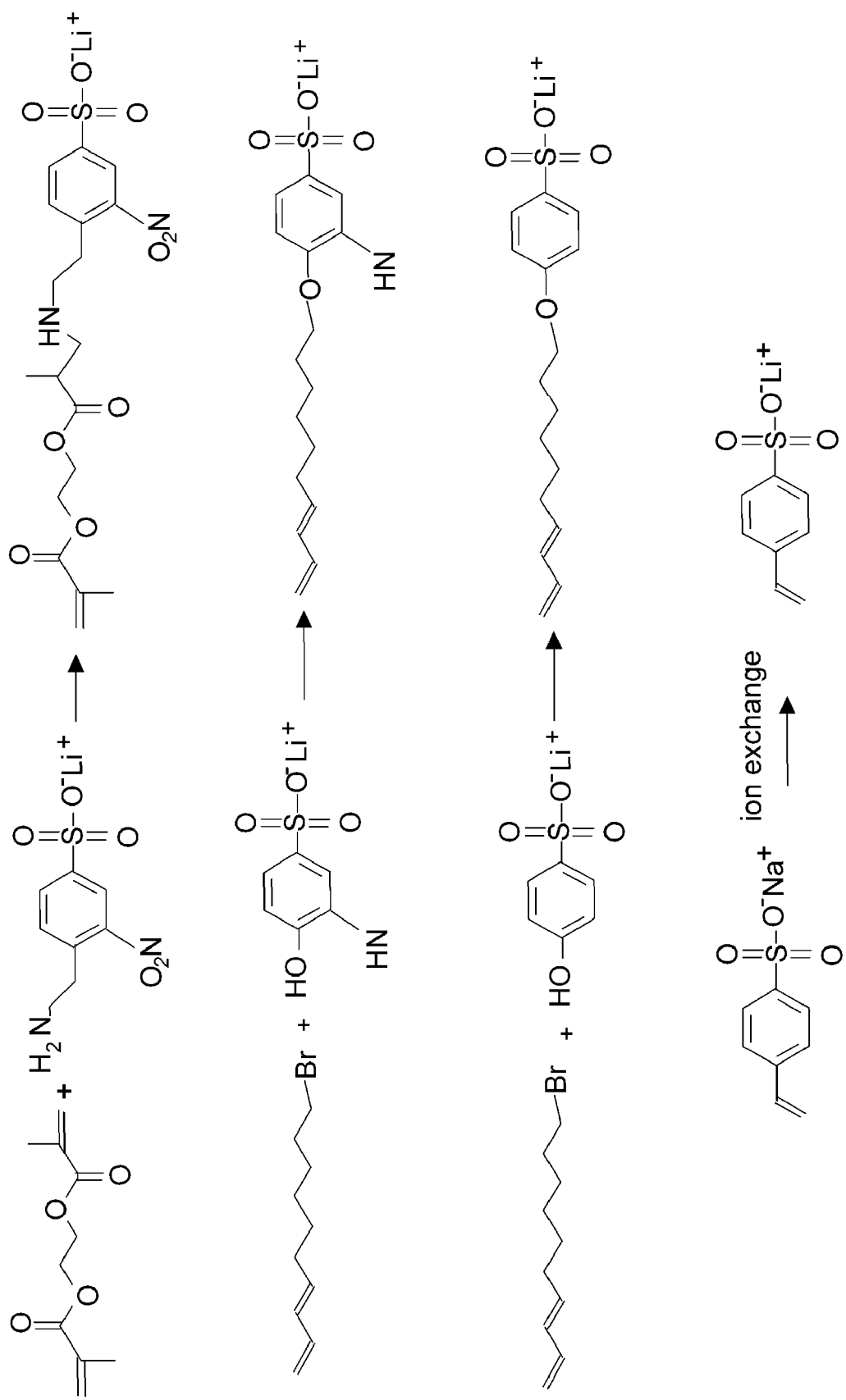
FIG. 20 shows examples of additional polymerizable surfactants that could form the cubic phase.
Figure 21:
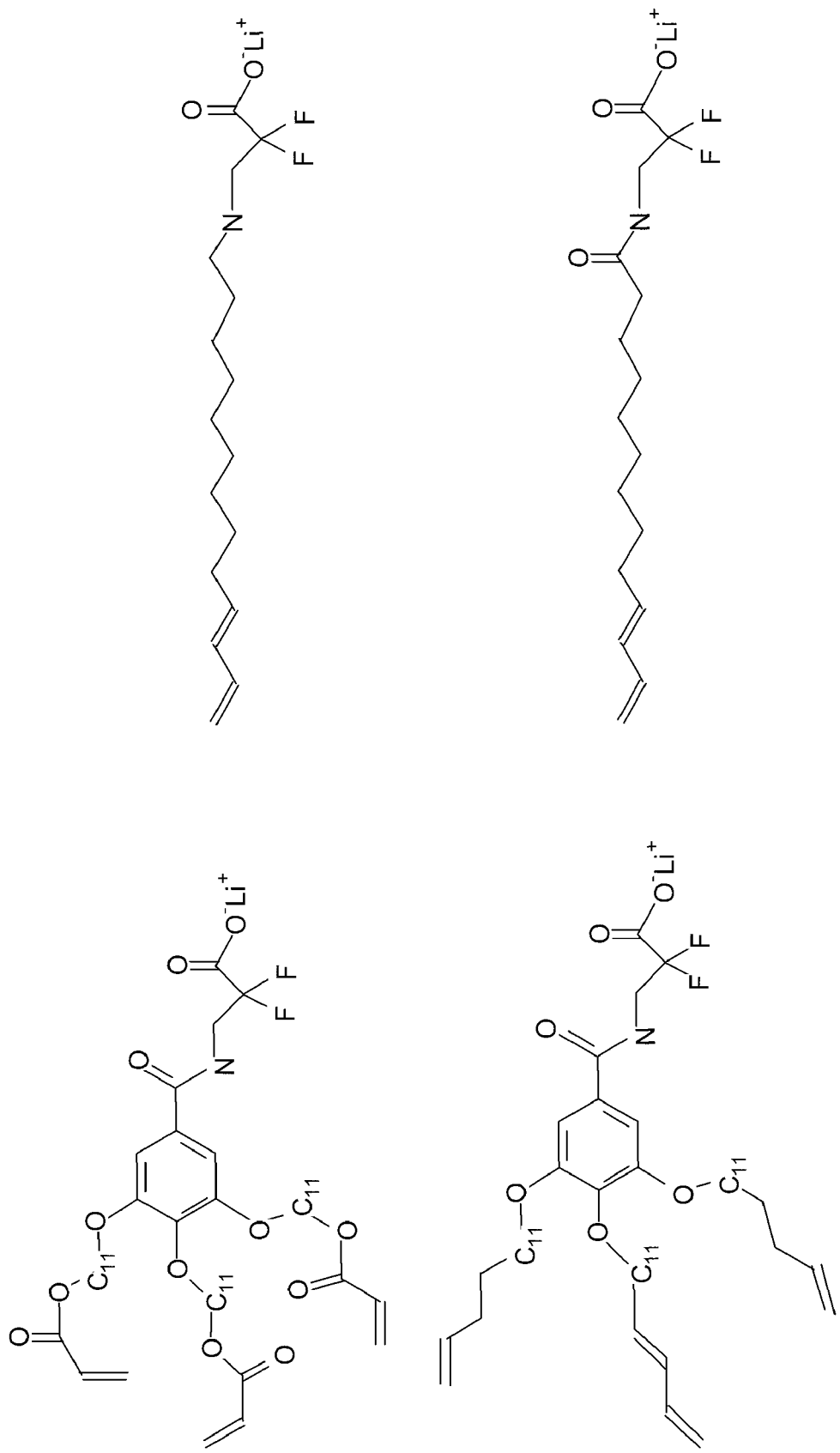
FIG. 21 illustrates polymerizable surfactants that have fluorinated head groups.

Specifically, the surfactants in FIGS. 20 and 21 have either an acrylate or diene polymerizable groups and fluorinated acid headgroups. The three-tailed surfactants may form the inverted hexagonal phase, while the linear surfactants may form the bi-continuous cubic phase.

EXAMPLE 8

Cationic Polymerizable Surfactants for Making Polymer Electrolytes

Figure 23:
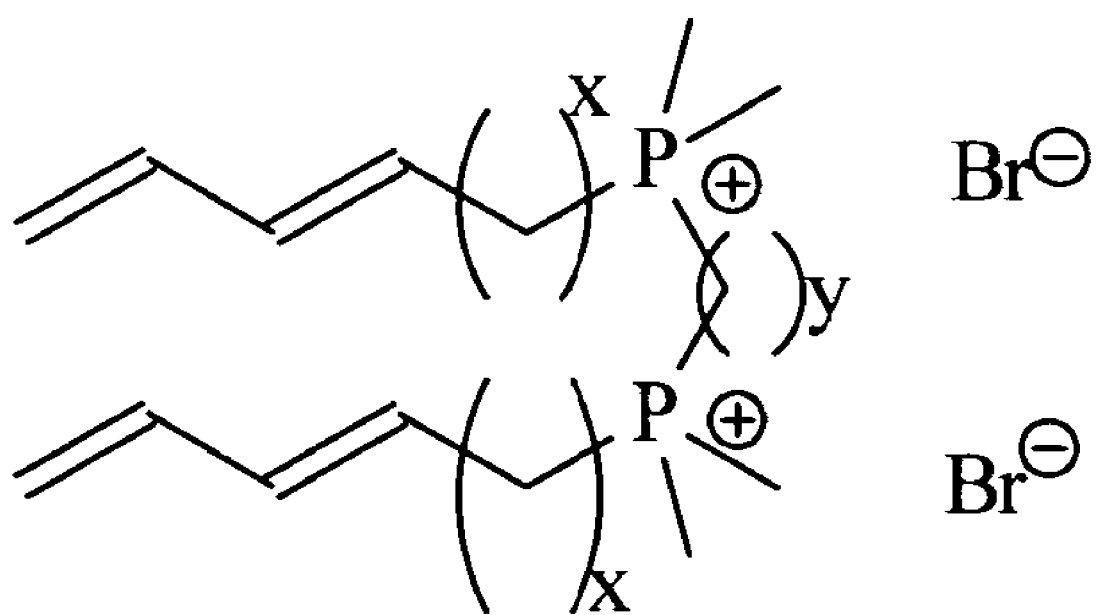
FIG. 23 shows an example of a "Gemini" surfactant with phosphonium head groups.

Self-assembled polymerizable surfactants may also be used as proton or hydroxyl conductors for applications such as fuel cell membranes or in nickel-cadmium batteries. Polymer electrolytes may be made from cationic surfactants. These cationic surfactants may comprise cationic head groups such as phosphonium or ammonium. The cationic surfactant may additionally have a "Gemini" structure with two linked cationic head groups and two tail groups (See FIG. 22(*a*)). The cation head groups may be linked by y number of carbons in the chain and the tail group may comprise x number of carbons in the chain. In general, x may comprise from 6 to 18 carbons, alternatively 10 carbons; y may comprise from 1 to 10 carbons, alternatively 6 carbons. Alternatively, the cationic surfactant may have a single head group and one or more tails (See FIGS. 22(*b*) & (*c*)). An example of a potential surfactant for forming an anion conductor may be a phosphonium "Gemini" surfactant with a halide anion such as $Br^-$ as shown in FIG. 23. These surfactants may form a bi-continuous cubic phase with a 3-dimensional network of pores which may be capable of conducting anions.

Although the present invention and its advantages have been described in detail, it should be understood that various changes, substitutions and alterations may be made herein without departing from the spirit and scope of the invention as defined by the appended claims.

We claim:

1. A method of making a polymer lithium electrolyte comprising:
   a) synthesizing a polymerizable lithium salt surfactant by reacting an acid chloride and a salt precursor; and
   b) crosslinking the polymerizable lithium salt surfactant to form a nanoporous polymer electrolyte;
   wherein the ionic conductivity of the nanoporous polymer electrolyte is equal or greater than $1.0 \times 10^{-6}$ S/cm.

2. The method of claim 1, wherein the polymerizable lithium salt surfactant has the formula:

where:
   X is a polymerizable functional group;
   R is a tail group;
   n is an integer signifying the number of tail groups;
   I is an ionic head group having a first charge;
   x is an integer signifying the number of ionic head groups;
   L is a linking moiety that connects the one or more tail groups to the ionic head group; and
   M is an ionic group having a second charge,
wherein the second charge is opposite the first charge.

3. The method of claim 2, wherein M comprises a lithium cation.

4. The method of claim 1, wherein the salt precursor comprises a sulfonate derivative selected from the group consisting of metanilate, sulfanilate, nitro aniline sulfonate, amino aniline sulfonate, methyl aniline sulfonate, or amino phenol sulfonate.

5. The method of claim 1, wherein the acid chloride comprises a benzoyl derivative.

* * * * *